United States Patent
Hwang et al.

(10) Patent No.: US 10,924,644 B2
(45) Date of Patent: Feb. 16, 2021

(54) CAMERA MODULE WITH ISOLATED FOCUSING AND STABILIZATION MECHANISM

(71) Applicant: Samsung Electronics Co., Ltd., Gyeonggi-do (KR)

(72) Inventors: Youngjae Hwang, Gyeonggi-do (KR); Kwangseok Byon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 13 days.

(21) Appl. No.: 16/258,827

(22) Filed: Jan. 28, 2019

(65) Prior Publication Data
US 2019/0238728 A1    Aug. 1, 2019

(30) Foreign Application Priority Data
Jan. 31, 2018    (KR) .................. 10-2018-0011983

(51) Int. Cl.
*H04N 5/225*    (2006.01)
*G01B 7/00*    (2006.01)
*H04N 5/232*    (2006.01)
*H02K 41/00*    (2006.01)
*H02K 41/035*    (2006.01)
(Continued)

(52) U.S. Cl.
CPC .......... *H04N 5/2252* (2013.01); *G01B 7/003* (2013.01); *G02B 7/08* (2013.01); *G02B 27/646* (2013.01); *H02K 16/00* (2013.01); *H02K 41/00* (2013.01); *H02K 41/0356* (2013.01); *H04N 5/2254* (2013.01); *H04N 5/2257* (2013.01); *H04N 5/23287* (2013.01)

(58) Field of Classification Search
CPC .............. H04N 5/2252; H04N 5/2254; H04N 5/23287; H04N 5/2257; H04N 5/2328; H04N 5/23212; H02K 16/00; H02K 41/0356; H02K 41/00; G02B 7/08; G02B 27/646; G01B 7/003
See application file for complete search history.

(56) References Cited

U.S. PATENT DOCUMENTS 8,818,181 B1    8/2014  Hwang et al.
9,575,329 B2 *  2/2017  Kim ................... G02B 27/646
(Continued)

FOREIGN PATENT DOCUMENTS

EP    1 814 318 A2    8/2008
EP    3 001 234 A1    3/2016
(Continued)

OTHER PUBLICATIONS

European Search Report dated Jun. 18, 2019.

*Primary Examiner* — Padma Haliyur
(74) *Attorney, Agent, or Firm* — Cha & Reiter, LLC.

(57) ABSTRACT

A camera module is disclosed. The camera module includes first and second housings, respectively including first and second lens groupings and first and second magnets, a third housing including a bottom surface, a wall surface, and first and second coils, a circuit board include an image sensor, the board adjacent to the third housing. The first housing is moveable in a first direction by interaction between the first magnet and first coil for adjusting a focus. The second housing is moveable in a second direction by interaction between the second magnet and second coil for anti-shake compensation.

20 Claims, 15 Drawing Sheets

(51) Int. Cl.
    *G02B 27/64* (2006.01)
    *G02B 7/08* (2021.01)
    *H02K 16/00* (2006.01)

(56) References Cited

U.S. PATENT DOCUMENTS

| | | |
|---|---|---|
| 2014/0362284 A1 | 12/2014 | Shin et al. |
| 2015/0049209 A1 | 2/2015 | Hwang et al. |
| 2016/0070115 A1 | 3/2016 | Miller et al. |
| 2016/0241787 A1 | 8/2016 | Sekimoto |
| 2016/0282580 A1* | 9/2016 | Koyama ............... H04N 5/2253 |

FOREIGN PATENT DOCUMENTS

| | | |
|---|---|---|
| JP | 2015-194660 A | 11/2015 |
| KR | 10-2017-0015427 A | 2/2017 |

\* cited by examiner

CAMERA MODULE WITH ISOLATED FOCUSING AND STABILIZATION MECHANISM

CROSS-REFERENCE TO RELATED APPLICATION(S)

This application is based on and claims priority under 35 U.S.C. § 119 to Korean Patent Application No. 10-2018-0011983, filed on Jan. 31, 2018, in the Korean Intellectual Property Office, the disclosure of which is incorporated by reference herein in its entirety.

BACKGROUND

1. Field

The disclosure relates to camera modules, and more particularly, to camera modules for use in portable electronic devices.

2. Description of Related Art

The term "electronic device" typically refers to a device that performs a particular function according to a program, such as a home appliance, an electronic scheduler, a portable multimedia player, a mobile communication terminal, a tablet PC, a video/sound device, a desktop PC or laptop computer, navigation for an automobile, etc. For example, electronic devices may output stored information as voices or images. Since electronic devices are highly integrated, and high-speed, high-volume wireless communication have become more commonplace, electronic devices such as mobile communication terminals have recently been equipped with a diversity of functions. For example, an electronic device comes with the integrated functionality, including entertainment functions, such as playing video games, multimedia functions, such as replaying music/videos, communication and security functions for mobile banking, and scheduling or e-wallet functions.

As the manufacturing technology of digital cameras advances, electronic devices equipped with slim, lightweight camera modules have become more popular commercially, encroaching on the compact digital camera market. Users may take advantage of various functionalities of an electronic device with camera modules, such as photographing, video recording, video calling, augmented reality (AR), etc., in a convenient manner, while carrying it all the time.

Following the trend of including camera modules in these portable electronic devices, active research efforts are underway to reduce the size of camera modules while enhancing performance and image quality. For example, autofocusing is among the techniques to allow camera modules to have better performance. Autofocusing may move the lens positioned ahead of the image sensor along the optical axis depending on the distance from the subject, enabling a clear image to form on the image-forming surface of the image sensor. Such autofocusing ability has been primarily adopted for high-end electronic devices, but is nowadays being equipped in entry-level ones.

Technology to bring about better performance for camera modules includes image stabilization (IS) (e.g., anti-shake). IS refers to a family of techniques that compensate for blurring caused by the user's hand shaking or body motion during image capturing. IS may achieve its goals by detecting the vibration of an electronic device, e.g., a camera, through multiple angular velocity sensors equipped in the electronic device and moving the lens or image sensor according to the angular velocity and direction of the detected vibration.

The above information is presented as background information only to assist with an understanding of the disclosure. No determination has been made, and no assertion is made, as to whether any of the above might be applicable as prior art with regard to the disclosure.

SUMMARY

According to an embodiment, there may be implemented a camera module with a plurality of lens groups, providing for a better-performing optical system.

According to an embodiment, in a camera module with a plurality of lens groups (e.g., a first lens group and a second lens group), an autofocusing structure including the first lens group may receive at least part of an optical image stabilizer structure including the second lens group, allowing for a smaller optical system.

According to an embodiment, a camera module may provide an autofocusing structure free of the influence of an optical image stabilizer.

According to an embodiment, a camera module does not add an extra load except for an optical image stabilizer driver and an autofocusing driver, thereby achieving compactness.

According to an embodiment, a camera module includes a first housing including a first lens group and a first magnet, a second housing including a second lens group and a second magnet, the second housing configured to receive at least part of the first housing, a third housing including a bottom surface defining an opening, and a wall surface perpendicular to the bottom surface of the third housing the wall surface configured to receive at least part of the second housing, the third housing further including a first coil formed on a portion of the wall surface, and a second coil formed on one of another portion of the wall surface and the bottom surface of the third housing, and a circuit board including an image sensor, the circuit board disposed adjacent the bottom surface of the third housing, wherein the first housing is moveable in a first direction responsive to an interaction between the first magnet and the first coil that adjusts a focus of the camera module, and the second housing moveable in a second direction responsive to an interaction between the second magnet and the second coil that at least partially compensates for shaking of the camera module. According to an embodiment, a camera module includes a second housing including a second lens group, a second magnet, and a first coil, the second magnet and first coil mounted on different surfaces respectively, the second housing further configured to receive at least part of the first housing, a third housing including a bottom surface defining an opening, and a wall surface disposed perpendicular to the bottom surface and configured to receive at least part of the second housing, the third housing further including a second coil formed on one of a portion of the wall surface and the bottom surface, and a circuit board including an image sensor and disposed adjacent the bottom surface, wherein the first housing is moveable in a first direction responsive to an interaction between the first magnet and the first coil adjusting a focus of the camera module, and the second housing is moveable in a second direction responsive to an interaction between the second magnet and the second coil at least partially compensating for shaking of the camera module.

According to an embodiment, a camera module includes a first housing including a first lens group, a second housing including a second lens group, the second housing configured to receive at least part of the first housing, a third housing including a first surface defining an opening, and a second surface perpendicular to the first surface, the third housing configured to receive at least part of the second housing, at least one first magnet disposed on an outer side surface of the first housing, at least one second magnet disposed on a surface of the second housing, at least one first coil oriented as to face the at least one first magnet, at least one second coil oriented to face the first surface or the second surface of the third housing and oriented as to face the at least one second magnet, and a circuit board including an image sensor facing the opening and disposed adjacent to the first surface, wherein the first housing is moveable in a first direction responsive to an interaction between the first magnet and the first coil adjusting a focus of the camera module, and the second housing is moveable in a second direction by an interaction between the second magnet and the second coil at least partially compensating for a shaking of the camera module.

Other aspects, advantages, and salient features of the disclosure will become apparent to those skilled in the art from the following detailed description, which, taken in conjunction with the annexed drawings, discloses example embodiments of the disclosure.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, such that.

Throughout the drawings, like reference numerals will be understood to refer to like parts, components, and structures.

DETAILED DESCRIPTION

Figure 1:
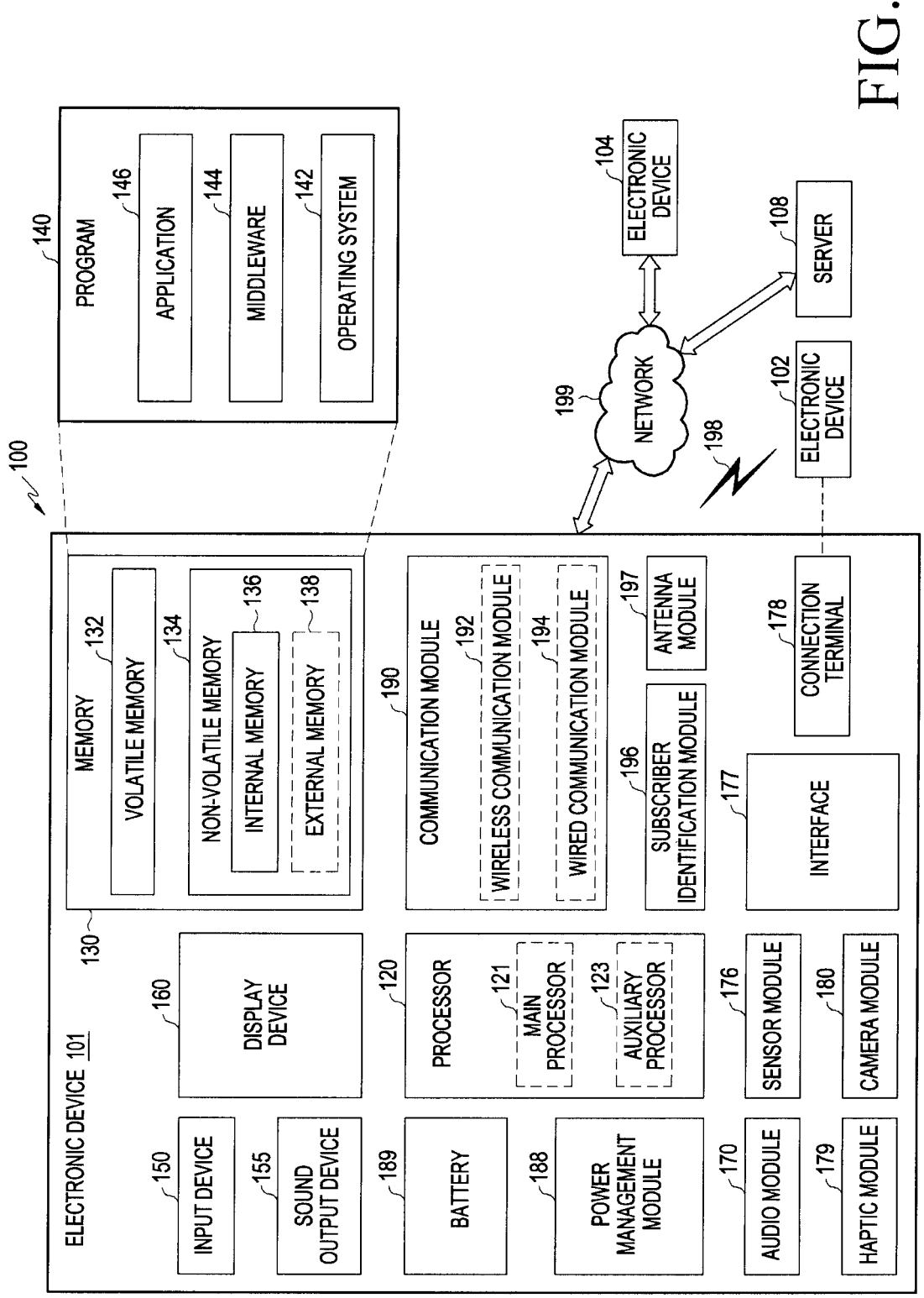
FIG. 1 is a block diagram illustrating an example electronic device 101 in a network environment 100 according to an embodiment.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, e.g., software (e.g., a program 140) to control at least one other component (e.g., a hardware or software component) of the electronic device 101 connected with the processor 120 and may process or compute various data. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone) directly or wirelessly connected with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or wireless communication channel between the electronic device 101 and an external electronic device (e.g., the electronic device 102, the electronic device 104, or the server 108) and performing communication through the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The first and second external electronic devices 102 and 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic device is not limited to the above-listed embodiments.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
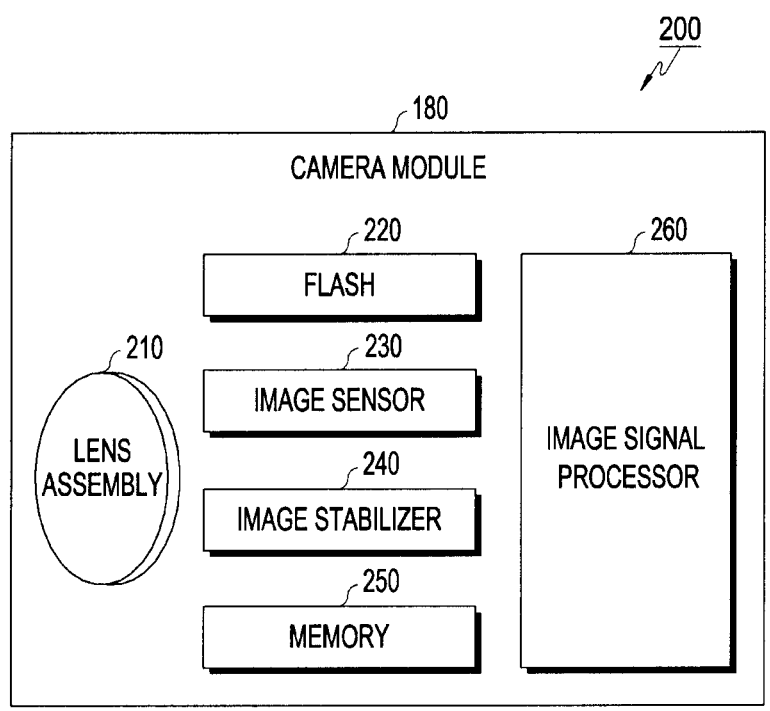
FIG. 2 is a block diagram (200) illustrating an example camera module 180 disposed in an electronic device according to an embodiment.

FIG. 2 is a block diagram (200) illustrating a camera module 180 disposed in an electronic device according to an embodiment. The camera module 180 of FIG. 2 may wholly or partially have the same configuration as the camera module 180 of FIG. 1.

Referring to FIG. 2, the camera module 180 may include a lens assembly 210, a flash 220, an image sensor 230, an image stabilizer 240, memory 250 (e.g., buffer memory), or an image signal processor 260.

According to an embodiment, the lens assembly 210 may collect light emitted or reflected from an object whose image is to be taken. The lens assembly 210 may include one or more lenses. According to an embodiment, the camera module 180 may include a plurality of lens assemblies 210. In this case, the camera module 180 may be, e.g., a dual camera, a 360-degree camera, or a spherical camera. The plurality of lens assemblies 210 may have the same lens attribute (e.g., view angle, focal length, auto-focusing, f number, or optical zoom), or at least one lens assembly may have at least one different lens attribute from another lens assembly. The lens assembly 210 may include, for example, a wide-angle lens or a telephoto lens.

According to an embodiment, the flash 220 may emit light that is used to reinforce light from an object. The flash 220 may include one or more light emitting diodes (LEDs) (e.g., a red-green-blue (RGB) LED, a white LED, an infrared (IR) LED, or an ultraviolet (UV) LED) or a xenon lamp.

According to an embodiment, the image sensor 230 may obtain an image corresponding to an object by converting light transmitted through the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor in the image sensor 230 may be implemented as, e.g., a charge-coupled device (CCD) sensor or a complementary metal-oxide-semiconductor (CMOS) sensor.

According to an embodiment, the image stabilizer 240 may move in a particular direction, or control (e.g., adjust the read-out timing of), the image sensor 230 or at least one lens included in the lens assembly 210 to at least partially compensate for a negative effect (e.g., image blurring) on a captured image, which is caused by a movement of the camera module 180 or the electronic device 101 including the camera module 280, in response to the movement. According to an embodiment, the image stabilizer 240 may be implemented as, e.g., an optical image stabilizer. The image stabilizer 240 may sense such motion using a gyro sensor (not shown) or an acceleration sensor (not shown) disposed inside or outside the camera module 180.

According to an embodiment, the memory 250 may store, at least temporarily, at least part of an image obtained via the image sensor 230 for a subsequent image processing task. For example, when image capturing is delayed due to shutter lag or multiple images are quickly captured, a raw image obtained (e.g., a high-resolution image) may be stored in the memory 250, and its corresponding copy (e.g., a low-resolution image) may be previewed through the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

According to an embodiment, the image signal processor 260 may perform image processing (e.g., depth map generation, three-dimensional (3D) modeling, panorama generation, feature point extraction, image mixing, or image compensation (e.g., noise canceling, resolution adjustment, brightness adjustment, blurring, sharpening, or softening)) on an image obtained through the image sensor 230 or an image stored in the memory 250. Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be transferred to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. When the image signal processor 260 is configured as a separate processor, images processed by the image signal processor 260 may be displayed through the display device 160 as they are or after further processed by the processor 120.

According to an embodiment, the electronic device 101 may include two or more camera modules 180 with different attributes or functions. In this case, at least one of the camera modules 180 may be, e.g., a wide-angle camera or a front camera while at least one other camera module may be a telephoto camera or a rear camera.

Figure 3:
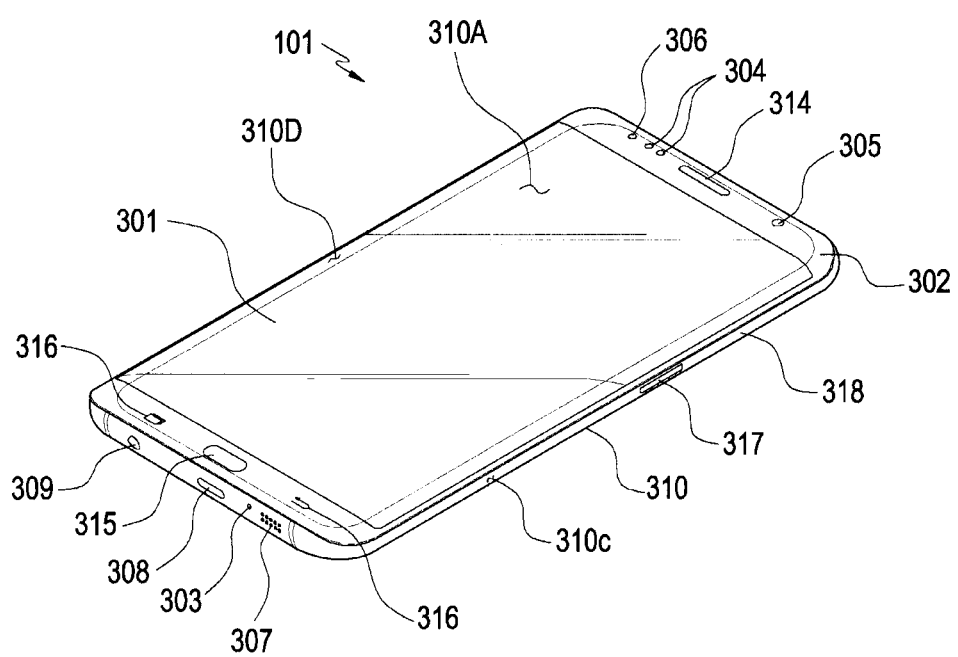
FIG. 3 is a front perspective view illustrating an example electronic device 101 according to an embodiment.
Figure 4:
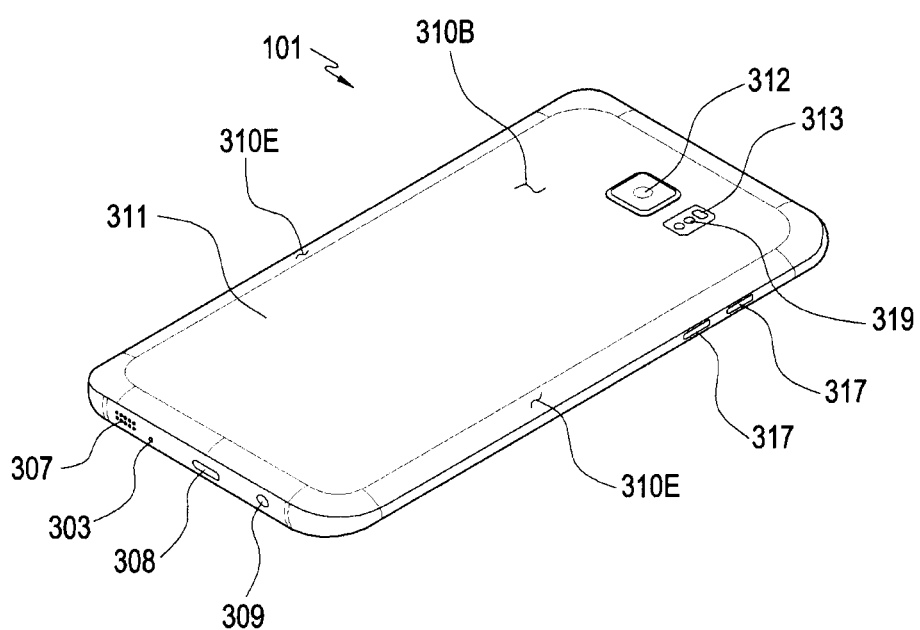
FIG. 4 is a rear perspective view illustrating an example electronic device 101 according to an embodiment.

FIG. 3 is a front perspective view illustrating an electronic device 101 according to an embodiment. FIG. 4 is a rear perspective view illustrating an electronic device 101 according to an embodiment.

Referring to FIGS. 3 and 4, according to an embodiment, an electronic device 101 may include a housing 310 with a first (or front) surface 310A, a second (or rear) surface 310B, and a side surface 310C surrounding a space between the first surface 310A and the second surface 310B. According to another embodiment (not shown), the housing 310 may denote a structure forming part of the first surface 310A, the second surface 310B, and the side surface 310C of FIG. 1. According to an embodiment, the first surface 310A may be formed by a front plate 302 (e.g., a glass plate or polymer plate with various coat layers) at least part of which is substantially transparent. The second surface 310B may be formed by a rear plate 311 that is substantially opaque. The rear plate 311 may be formed of, e.g., laminated or colored glass, ceramic, polymer, metal (e.g., aluminum, stainless steel (STS), or magnesium), or a combination of at least two thereof. The side surface 310C may be formed by a side bezel structure (or a "side member") 318 that couples to the front plate 302 and the rear plate 311 and includes a metal and/or polymer. According to an embodiment, the rear plate 311 and the side bezel plate 318 may be integrally formed together and may include the same material (e.g., a metal, such as aluminum).

In the embodiment illustrated, the front plate 302 may include first regions 310D, which seamlessly and bendingly extend from the first surface 310A to the rear plate, on both the long edges of the front plate. In the embodiment (refer to FIG. 2) illustrated, the rear plate 311 may include second regions 310E, which seamlessly and bendingly extend from the second surface 310B to the front plate, on both the long edges. According to an embodiment, the front plate or the rear plate may include only either the first regions or second regions. According to an embodiment, at a side view of the electronic device, the side bezel structure may have a first thickness (or width) for sides that do not have the first regions or the second regions and a second thickness, which is smaller than the first thickness, for sides that have the first regions or the second regions.

According to an embodiment, the electronic device 101 may include at least one or more of a display 301, audio modules 303, 307, and 314, sensor modules 304 and 319, camera module 305, 312, and 313, key input devices 315, 316, and 317, an indicator 306, or connector holes 308 and 309. According to an embodiment, the electronic device 101 may exclude at least one (e.g., the key input devices 315, 316, and 317 or the indicator 306) of the components or may add other components.

According to an embodiment, the display 301 may be exposed through a majority portion of the front plate 302. According to an embodiment, at least a portion of the display 301 may be exposed through the front plate 302 that forms the first surface 310A and the first regions 310D of the side surface 310C. The display 301 may be disposed to be coupled with, or adjacent to, a touch detecting circuit, a pressure sensor capable of measuring the strength (pressure) of touches, and/or a digitizer for detecting a magnetic field-type stylus pen. According to an embodiment, at least part of the sensor modules 304 and 319 and/or at least part of the key input devices 315, 316, and 317 may be disposed in the first regions 310D and/or the second regions 310E.

According to an embodiment, the audio modules (or holes) 303, 307, and 314 may include a microphone hole 303 and speaker holes 307 and 314. The microphone hole 303 may have a microphone inside to obtain external sounds. According to an embodiment, there may be a plurality of microphones that are able to detect the direction of a sound. The speaker (and receiver) holes 307 and 314 may include an external speaker hole 307 and a phone receiver hole 314. According to an embodiment, the speaker holes 307 and 314 and the microphone hole 303 may be implemented as a single hole, or speakers may be included without the speaker holes 307 and 314 (e.g., piezo speakers).

The sensor modules 304 and 319 may generate an electrical signal or data value corresponding to an internal operating state or external environmental state of the electronic device 101. The sensor modules 304 and 319 may include a first sensor module 304 (e.g., a proximity sensor) disposed on the first surface 310A of the housing 310, and/or a second sensor module (not shown) (e.g., a fingerprint sensor), and/or a third sensor module 319 (e.g., a heart-rate monitor (FIRM) sensor) disposed on the second surface 310B of the housing 310. The fingerprint sensor may be disposed on the second surface 310A as well as on the first surface 310B (e.g., the home key button 315) of the housing 310. The electronic device 101 may further include sensor modules not shown, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 304.

According to an embodiment, the camera modules 305, 312, and 313 may include a first camera device 305 disposed on the first surface 310A of the electronic device 101, a second camera device 312 (e.g., the camera module 180 of FIGS. 1 and 2) disposed on the second surface 310B, and/or a flash 313. The camera modules 305 and 312 may include one or more lenses, an image sensor, and/or an image signal processor. The flash 313 may include, e.g., a light emitting diode (LED) or a xenon lamp. According to an embodiment, two or more lenses (a wide-angle lens and a telescopic lens) and image sensors may be disposed on one surface of the electronic device 101.

According to an embodiment, the key input devices 315, 316, and 317 may include a home key button 315 disposed on the first surface 310A of the housing 310, a touchpad 316 disposed around the home key button 315, and/or a side key button 317 disposed on the side surface 310C of the housing 310. According to an embodiment, the electronic device 101 may exclude all or some of the above-mentioned key input devices 315, 316, and 317 and the excluded key input devices 315, 316, and 317 may be implemented in other forms, e.g., as soft keys, on the display 301.

According to an embodiment, the indicator 306 may be disposed, e.g., on the first surface 310A of the housing 310. The indicator 306 may provide, e.g., state information of the electronic device 101 in the form of light and may include an LED.

According to an embodiment, the connector holes 308 and 309 may include a first connector hole 308 for receiving a connector (e.g., a universal serial bus (USB) connector) for transmitting or receiving power and/or data to/from an external electronic device and/or a second connector hole 309 (or, an earphone jack) for receiving a connector for transmitting or receiving audio signals to/from the external electronic device.

Figure 5:
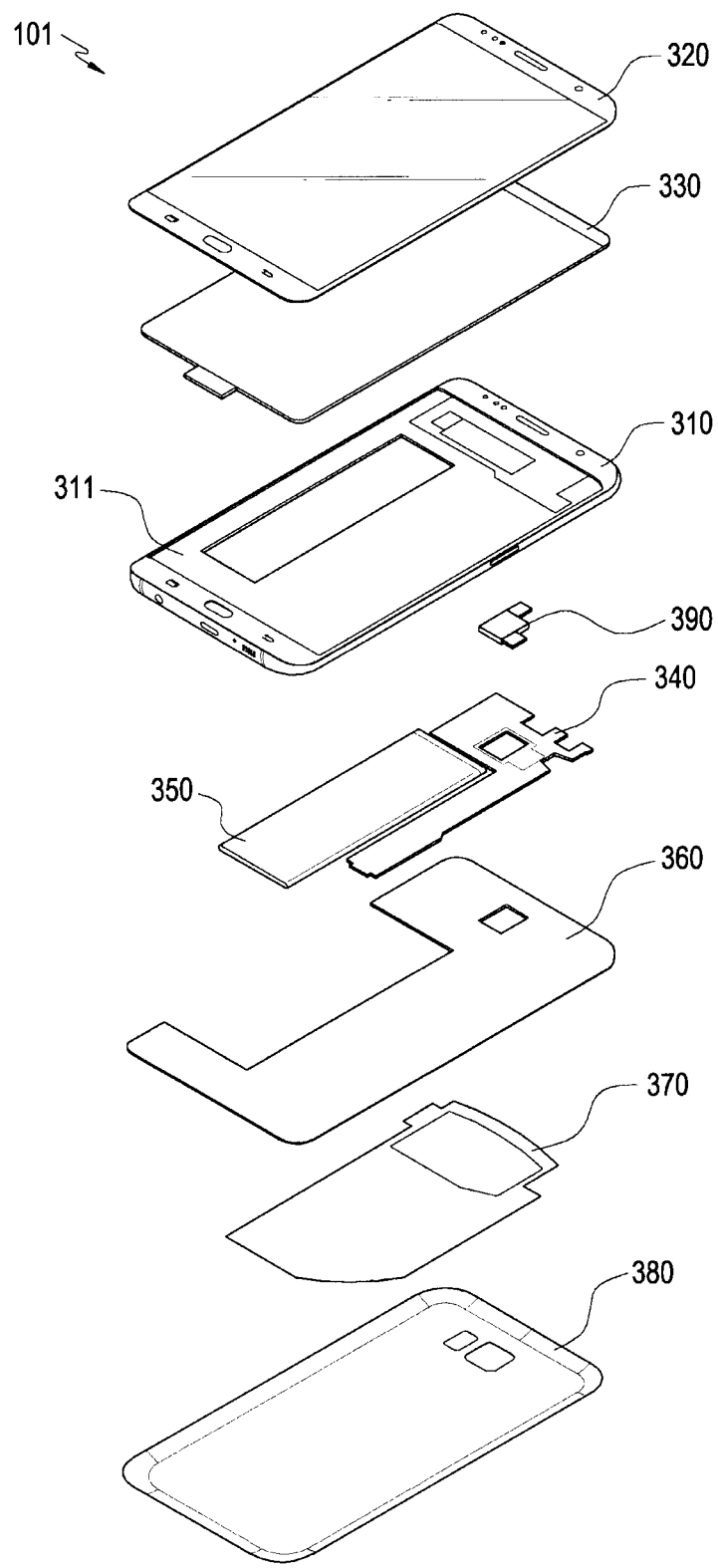
FIG. 5 is an exploded perspective view illustrating an example electronic device 101 according to an embodiment.

FIG. 5 is an exploded perspective view illustrating an electronic device 101 according to an embodiment.

Referring to FIG. 3, an electronic device 101 may include a side bezel structure of the housing 310, a first supporting member 311 (e.g., a bracket), a front plate 320, a display 330, a printed circuit board 340, a battery 350, a second supporting member 360 (e.g., a rear case), an antenna 370, a rear plate 380, and a camera module 390. According to an embodiment, the electronic device 101 may exclude at least one (e.g., the first supporting member 311 or second supporting member 360) of the components or may add other components. At least one of the components of the electronic device 101 may be the same or similar to at least one of the components of the electronic device 101 of FIG. 2, and no duplicate description is made below.

According to an embodiment, the first supporting member 311 may be disposed inside the electronic device 101 such that it is connected with the side bezel structure of the housing 310 or integrated with the side bezel structure 310. The first supporting member 311 may be formed of, e.g., a metal and/or non-metallic material (e.g., polymer). The display 330 may be joined onto one surface of the first supporting member 311, and the printed circuit board 340 may be joined onto the opposite surface of the first supporting member 311. A processor, memory, and/or interface may be mounted on the printed circuit board 340. The processor may include one or more of, e.g., a central processing unit, an application processor, a graphics processing device, an image signal processing, a sensor hub processor, or a communication processor.

According to an embodiment, the memory may include, e.g., a volatile or non-volatile memory.

According to an embodiment, the interface may include, for example, a high definition multimedia interface (HDMI), a universal serial bus (USB) interface, a secure digital (SD) card interface, and/or an audio interface. The interface may electrically or physically connect, e.g., the electronic device 101 with an external electronic device and may include a USB connector, an SD card/multimedia card (MMC) connector, or an audio connector.

According to an embodiment, the battery 350 may be a device for supplying power to at least one component of the electronic device 101. The battery 189 may include, e.g., a primary cell which is not rechargeable, a secondary cell which is rechargeable, or a fuel cell. At least a portion of the battery 350 may be disposed on substantially the same plane as the printed circuit board 340. The battery 350 may be integrated or detachably disposed inside the electronic device 101.

According to an embodiment, the antenna 370 may be disposed between the rear plate 380 and the battery 350. The antenna 370 may include, e.g., a near-field communication (NFC) antenna, a wireless charging antenna, and/or a magnetic secure transmission (MST) antenna. The antenna 370 may perform short-range communication with, e.g., an external device or may wirelessly transmit or receive power utilized for charging. According to an embodiment, an antenna structure may be formed by a portion or combination of the side bezel structure of the housing 310 and/or the first supporting member 311.

According to an embodiment, the camera module 390 (e.g., the camera module 180 of FIGS. 1 and 2 or the camera module 312 of FIG. 4) may be disposed between the first supporting member 311 and the rear plate 380. For example, the camera module 390 may at least partially be exposed through the opening of the rear plate 380.

According to an embodiment, the camera module 390 may include an autofocusing (AF) structure that is moved along the optical axis of the image sensor and an optical image stabilizer (OIS) that receives the AF structure so as to be moved in a direction perpendicular to the optical axis along with the AF structure. The OIS may compensate for image blurring due to the vibration of the camera module 390 by moving in the direction perpendicular to the optical axis, according to an embodiment.

The AF structure may be smoothly moved back and forth by a guide provided along the optical axis, e.g., a ball bearing structure. The OIS may be smoothly moved on the plane perpendicular to the optical axis by, e.g., a ball bearing structure or a wire supporting structure. The force to move back and forth the AF structure and/or OIS may come from a voice coil motor.

The camera module 390 is described below in detail.

Figure 6:
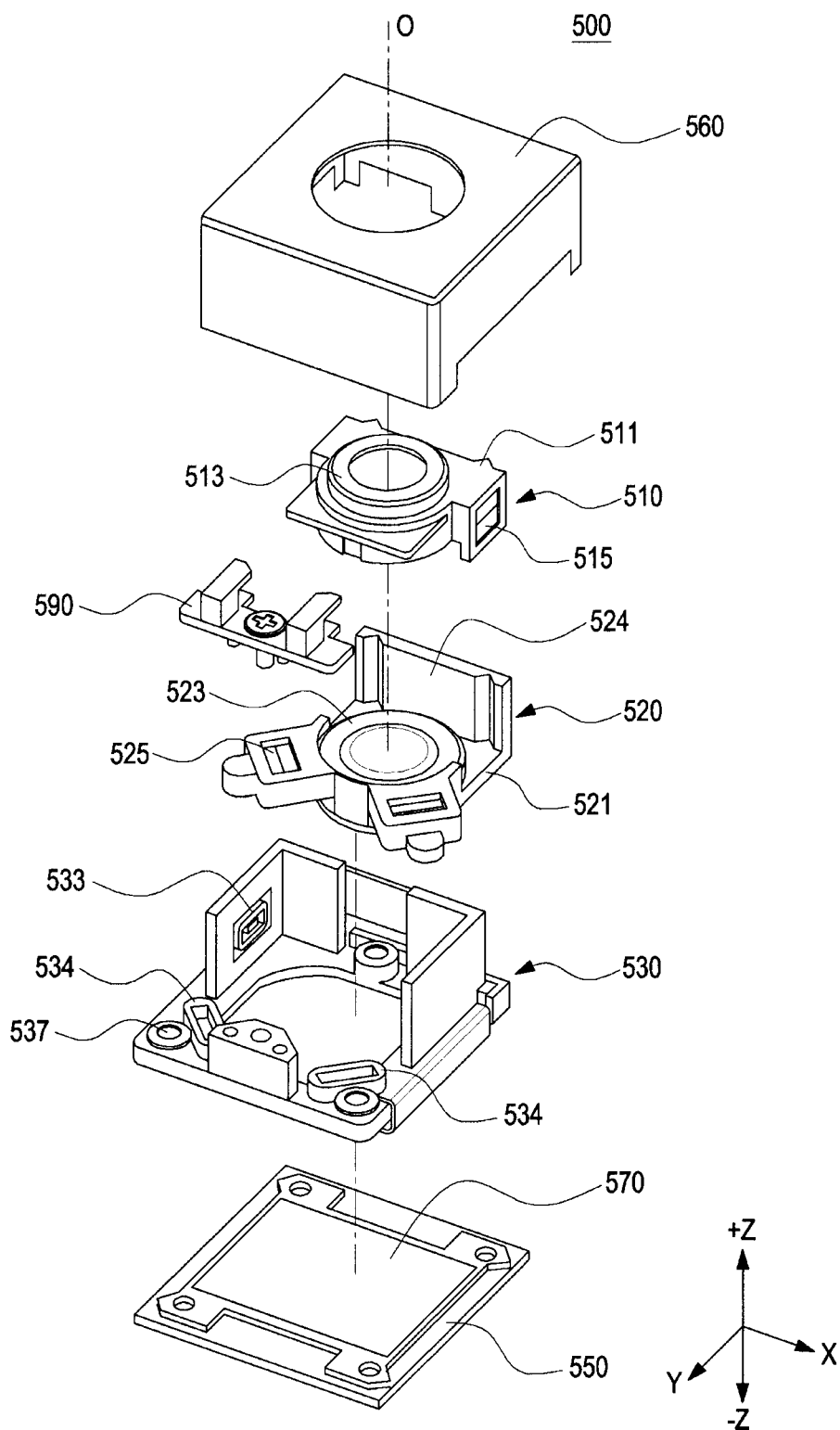
FIG. 6 is a perspective view illustrating an example camera module 500 partially disassembled, according to an embodiment.
Figure 7:
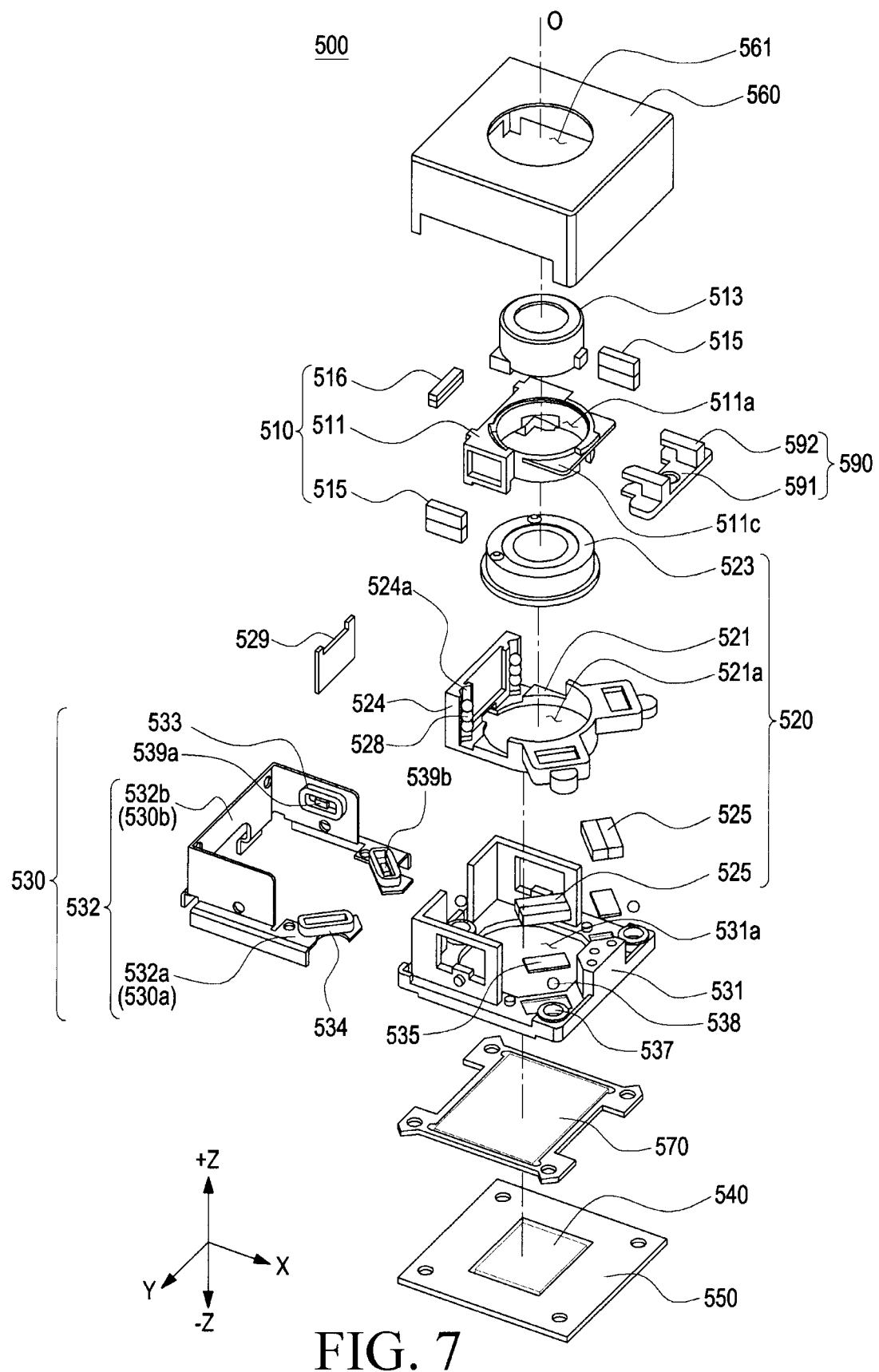
FIG. 7 is an exploded perspective view illustrating an example camera module 500 as shown in FIG. 6, according to an embodiment.

FIG. 6 is a perspective view illustrating a partially disassembled camera module 500, according to an embodiment. FIG. 7 is an exploded perspective view illustrating a camera module 500 as shown in FIG. 6, according to an embodiment.

Referring to FIGS. 6 and 7, a camera module 500 may include a first assembly 510 including a first lens group 513, a second assembly 520 including a second lens group 523, a base 530 supporting the first assembly 510 and/or the second assembly 520, a circuit board 550 on which an image sensor 540 is disposed, and a cover member 560. As another example, the camera module 500 may include a stopper 590 which may serve to restrict the movement of the first assembly 510.

The camera module 500 of FIGS. 6 and 7 may be fully or partly the same in structure as the camera module 180 of FIGS. 1 and 2, the camera module 112 of FIG. 4, and the camera module 390 of FIG. 5.

According to an embodiment, the camera module 500 may include the first lens group 513 and the second lens group 523, which may be disposed under the first lens group 513. The first lens group 513 and the second lens group 523 may be spaced apart from each other and may implement movement in the same or different directions. For example, the first lens group 513 may be an assembly of a plurality of lenses and be configured with various optical members, such as a concave lens or convex lens, disposed along the optical path (e.g., the optical axis "O" direction). As another example, the second lens group 523 may be an assembly of a plurality of lenses and be configured with various optical members, such as a concave lens or convex lens, disposed along the optical path (e.g., the optical axis "O" direction).

According to an embodiment, the first lens group 513 may be disposed over the second lens group 523 and may be moved in a first direction +Z or −Z as autofocusing of the camera module 500 is performed or executed. The second lens group 523, along with the first lens group 513, may be moved in a second direction X or Y as optical image stabilizing of the camera module 500 is performed or executed.

According to an embodiment, the first assembly 510 may include a first housing 511 and the first lens group 513 and first magnets 515 mounted in the first housing 511. The first housing 511 may include a central first through hole 511a which is centered to the optical axis O. The first lens group 513 may be mounted through the first through hole 511a of the first housing 511 and may be fixed in the first housing 511 so as to be movable along with the first housing 511 along the optical axis O.

According to an embodiment, a pair of first magnets 515 may be disposed on the side surfaces of the first housing 511 so as to face each other. For example, the first magnets 515 of the first housing 511 may be disposed parallel to the optical axis O. The first magnet 515 may be disposed to face first coils 533 each disposed on one surface of the base 530. A supporting magnet 516 may be disposed on one side surface of the first housing 511 other than the side surfaces where the pair of first magnets 515 are disposed, to support the first housing 511 to the inside of a second housing 521.

According to an embodiment, the first housing 511 may be moved in the first direction +Z or −Z by an interaction between the first magnets 515 and the first coils 533 in order to shift the focus of the camera module 500. For example, when a signal is applied to the first coils 533 through a flexible circuit board 532 mounted on the base 530, an electromagnetic force created between the first coils 533 and the first magnets 515 may move back and forth the first housing 511 including the first lens group 513 along the optical axis O.

According to an embodiment, the second assembly 520 may include the second housing 521 and the second lens group 523 and second magnets 525 mounted in the second housing 521. The second housing 521 may include a central second through hole 521a which is centered to the optical axis O. The second lens group 523 may be mounted through the second through hole 521a of the second housing 521.

According to an embodiment, the second housing 521 may receive at least part of the first housing 511. For example, the second housing 521 may be formed to have an opening in the first direction +Z or −Z and to surround at least a portion (e.g., a bottom portion) of the first housing 511. At least a portion (e.g., a top portion) of the second housing 521 may be formed to have a shape corresponding to a bottom portion of the first housing 511 to stably support the first housing 511 seated therein.

According to an embodiment, a plurality of second magnets 525 may be disposed towards the Z axis on side surfaces of the second housing 521. For example, the second housing 521 may include a pair of seats projecting in a direction perpendicular to the optical axis O around the second through hole 521a to seat the pair of second magnets 525 towards the base 530.

According to an embodiment, the second housing 521 may be moved in the second direction X or Y perpendicular to the first direction +Z or −Z by an interaction between second coils 534 disposed on the base 530 and the second magnets 525, at least partially correcting the movement of the camera module 500. For example, when a signal is applied to the second coils 534 through the flexible circuit board 532 mounted on the base 530, an electromagnetic force created between the second coils 534 and the second magnets 525 may horizontally move the second housing 521 including the second lens group 523 in the second direction X or Y on the plane perpendicular to the optical axis O.

According to an embodiment, the first housing 511 received in the second housing 521 may, together with the first housing 511, be horizontally moved in the second direction X or Y as the second housing 521 is moved in the second direction X or Y.

According to an embodiment, the second housing 521 may include a guide 524 to guide a back-and-forth motion of the first housing 511 received therein. For example, the guide 524 may be disposed on a side surface of the second housing 521 to direct a driving force created by the first coils 533 and the first magnets 515 in the first direction +Z or −Z. To smoothen the back-and-forth motion of the first assembly 510, a plurality of balls 528 (e.g., bearings) may be provided between the guide 524 and the first assembly 510. For example, the balls 528 may roll between the guide 524 and the first assembly 510 to allow the first assembly 510 to smoothly move back and forth in the first direction +Z or −Z.

According to an embodiment, the second housing 521 may have guide grooves 524a, preventing the first assembly 510 from moving in directions other than the optical axis O. For example, the guide grooves 524a may be formed on at least one of the guide 524 or the first housing 511, extend along the optical axis O, and have a V-shaped cross-section. In the configuration of the camera module 500 as shown, the guide grooves 524a are formed on each of the guide 524 and the first housing 511. The respective portions of the balls 528 may be disposed in the guide grooves 524a formed in the guide 524, and the respective opposite portions of the balls 528 may be disposed in the guide grooves (not shown) formed in a side surface of the first housing 511. By adopting the balls 528 with a sufficiently large diameter, although the balls 528 are partly received in the guide grooves 524a, a gap may be secured between the guide 524 and the first housing 511. This may prevent the guide 524 and the first housing 511 from directly contacting each other while enabling the first assembly 510 to move back and forth more smoothly.

According to an embodiment, a first yoke 529 may be mounted on the guide 524. The first yoke 529 may be disposed to face the supporting magnet 516, with the guide 524 of the second housing 521 interposed therebetween. As the first yoke 529 is provided, an electromagnetic force between the first coils 533 and the first magnets 515 may be focused, thus enhancing the efficiency of the voice coil motor. As another example, the first housing 511 may be pushed towards the guide 524 by the attraction between the supporting magnet 516 and the first yoke 529. The balls 528 between the guide 524 and the first assembly 510 may keep the first assembly 510 smoothly moving back and forth.

According to an embodiment, the base 530 may include a third housing 531, the flexible circuit board 532 formed to surround at least one side surface of the third housing 531, the first coils 533, and the second coils 534. The third housing 531 may have a center opening 531a which is centered to the optical axis O. The base 530 may receive the first housing 511 and the second housing 521 that are at least partially laid one over the other.

According to an embodiment, the third housing 531 and the flexible circuit board 532 may include a first surface (e.g., a bottom surface) 530a facing the bottom of the second housing 521 and a second surface (e.g., a wall surface) 530b perpendicular to the first surface 530a. The second coils 534 may be disposed on at least part of the first surface 530a or the second surface 530b. The first coils 533 may be disposed on at least a portion of the second surface 530b.

According to an embodiment, the flexible circuit board 532 may be formed to surround at least one outer surface of the third housing 531. The flexible circuit board 532 may be implemented in a flexible shape and be formed corresponding to the shape of a step or rib of the third housing 531.

According to an embodiment, the pair of first coils 533 may be disposed on the inner side surfaces of the flexible circuit board 532 so as to face each other. The pair of first coils 533 disposed on the flexible circuit board 532 may at least partially be exposed through the opening formed in the side surface of the third housing 531. The first coils 533, along with the first magnets 515 disposed in the first housing 511, may form a voice coil motor. When a signal is applied to the first coils 533 through a flexible circuit board 532, an electromagnetic force created between the first coils 533 and the first magnets 515 may move back and forth the first housing 511 including the first lens group 513 along the optical axis O.

According to an embodiment, the base 530 may include first sensors 539a to detect the displacement and/or position of the first assembly 510. For example, the first sensors 539a may be disposed on the side surface 532b of the flexible circuit board 532 to at least partially be surrounded by the first coils 533 and may be integrated with the flexible circuit board 532. The first sensors 539a may be position detecting sensors, e.g., hall sensors. As another example, the first sensors 539a may be configured with, e.g., an optical or mechanical encoder. As another example, a driving circuit unit of the flexible circuit board 532 may apply a driving signal for autofocusing to the first coils 533 based on, e.g., focusing state information provided through a separate path and position information of the first assembly 510 detected by the first sensors 539a.

According to an embodiment, the pair of second coils 534 may be spaced apart and parallel to each other in the first direction +Z or −Z on the bottom surface 532a of the flexible circuit board 532. The pair of second coil 534 disposed on the flexible circuit board 532 may face the pair of second magnets 525 disposed on the second housing 521. The second coils 534, along with the second magnets 525 disposed in the second housing 521, may form a voice coil motor. When a signal is applied to the second coils 534 through the flexible circuit board 532, an electromagnetic force created between the second coils 534 and the second magnets 525 may horizontally move the second housing 521 including the second lens group 523 in the second direction X or Y on the plane perpendicular to the optical axis O.

According to an embodiment, the base 530 may include second sensors 539b to detect the displacement and/or position of the second assembly 520. For example, the second sensors 539b may be disposed on the bottom surface 532a of the flexible circuit board 532 to at least partially be surrounded by the second coils 534 and may be integrated with the flexible circuit board 532. The second sensors 539b may be position detecting sensors, e.g., hall sensors. As another example, the second sensors 539b may be configured with, e.g., an optical or mechanical encoder. As another example, a driving circuit unit of the flexible circuit board 532 may apply a driving signal for autofocusing to the second coils 534 based on, e.g., focusing state information provided through a separate path and position information of the second assembly 520 detected by the second sensors 539a.

According to an embodiment, a second yoke 535 may be mounted on the bottom surface facing in the first direction +Z or −Z of the third housing 531. The second yoke 535 may be disposed to face the second magnets 525, with the second coils 534 interposed therebetween. As the second yoke 535 is provided, an electromagnetic force between the second coils 534 and the second magnets 525 may be focused, thus enhancing the efficiency of the voice coil motor. As another example, the second housing 521 may be pushed towards the third housing 531 by the attraction between the second magnets 525 and the second yoke 535. The balls 538a between the second housing 521 and the third housing 531 may allow the second assembly 520 to smoothly move horizontally on the plane perpendicular to the optical axis O in the second direction X or Y.

According to an embodiment, the base 530 may include guide holes 537 to guide the movement of the second assembly 520 and other balls 538b. There may be a plurality of guide holes 537 at the corners on the bottom surface of the third housing 531. The guide holes 537 may prevent the second assembly 520 from moving in directions other than the horizontal direction (e.g., the second direction X or Y). For example, the balls 528b may roll between the third housing 531 and the second housing 521, allowing the second assembly 520 to smoothly move horizontally.

According to an embodiment, the guide holes 537 may be formed in at least one of the third housing 531 or the second housing 521 and have a cylinder shape with a diameter larger than the balls 538b. The respective portions of the balls 538b may be disposed in the guide holes 537 formed in the third housing 531, and the respective opposite portions of the balls 538b may be disposed in the guide holes (not shown) formed in a side surface of the second housing 521. By adopting the balls 538b with a sufficiently larger diameter than the height of the guide holes 537, although the balls 538b are partly received in the guide holes 537, a gap may be secured between the third housing 531 and the second housing 521. This may prevent the third housing 531 and the second housing 521 from directly contacting each other while enabling the second assembly 520 to move horizontally more smoothly.

According to an embodiment, the camera module 500 may include a stopper 590 to restrict the movement of the first assembly 510. The stopper 590 may be attached on one surface of the third housing 531 by a screw or other coupling member, restricting the movement in the first direction +Z or −Z of the first assembly 510 disposed inside the third housing 531.

According to an embodiment, the stopper 590 may include a supporting part 591 attached to the third housing 531 and at least one path restricting part 592 extending from the supporting part 591. The path restricting part 592 may provide a space to limit the movement of a protrusion 511c of the first housing 511 within a predetermined distance in the first direction +Z or −Z. For example, the path restricting part 592 may be shaped like "[" or "]". As another example, there may be provided a plurality of path restricting parts 592 to stably support the movement of the first housing 511.

According to an embodiment, the camera module 500 may include a circuit board 550 including the image sensor 540. The circuit board 550 including the image sensor 540 may be disposed adjacent to the bottom surface of the third housing 531. The image sensor 540 may be installed on the bottom surface of the third housing 531 so as to face the open top surface (with the opening 531a) of the third housing 531 The image sensor 540 may be mounted on the circuit board 550 and may be connected to an image processing device of the electronic device packing the camera module 500, e.g., a digital camera, mobile communication terminal, or tablet PC. As another example, an infrared (IR) filter 570 may be disposed between the circuit board 550 on which the image sensor 540 is disposed and the third housing 531.

According to an embodiment, the camera module 500 may further include a cover member 560 to close the open top surfaces of the housings (e.g., the first housing 511, the second housing 521, and the third housing 531). After the first housing 511 and the second housing 521 are installed in the third housing 531, the cover member 560 may close the housings, protecting the internal space. As another example, the cover member 560 may include a top opening 561 through which at least part of the first lens group 513 may be exposed to the outside.

The operation of the camera module 500 is described below in detail.

Figure 8:
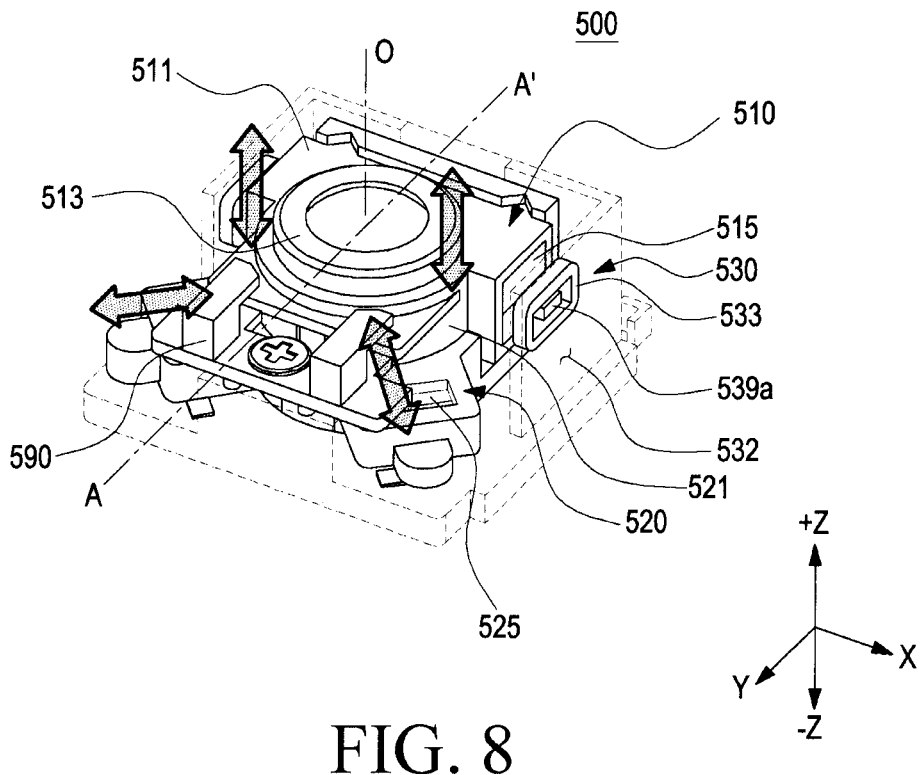
FIG. 8 is a perspective view illustrating an example camera module 500 moving in one direction, with a cover member 560 excluded, according to an embodiment.
Figure 9:
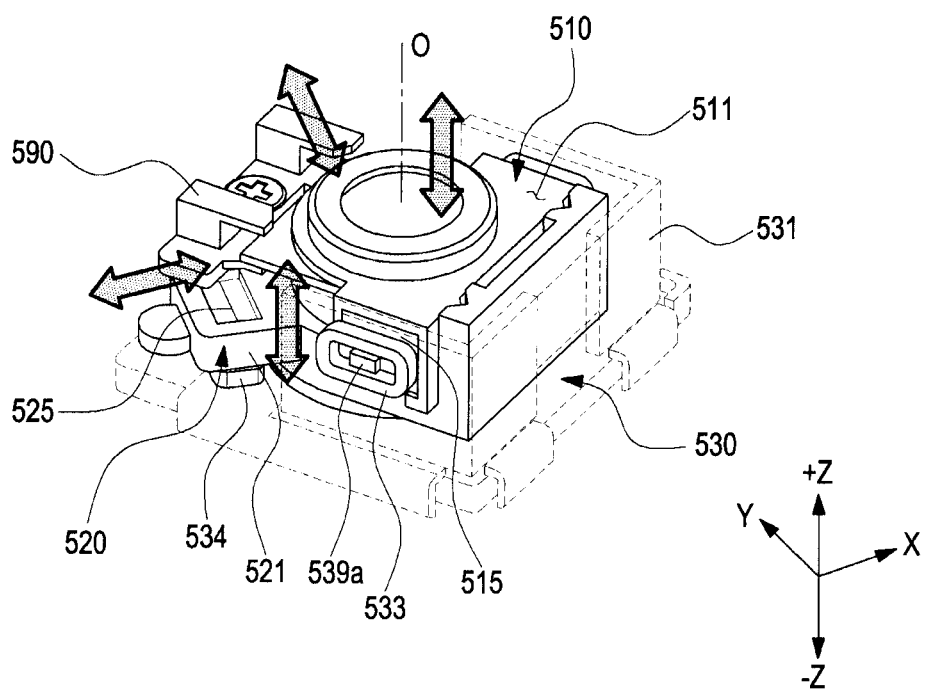
FIG. 9 is a perspective view illustrating an example camera module 500 moving in another direction, with a cover member 560 excluded, according to an embodiment.
Figure 10:
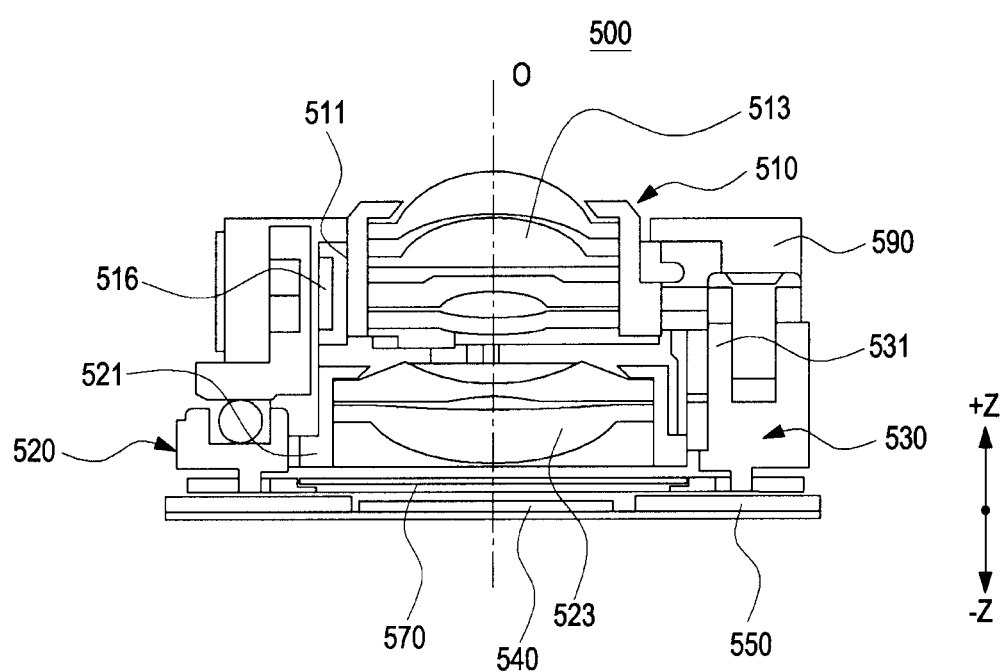
FIG. 10 is a cross-sectional view of an example camera module 500, as shown in FIG. 8, taken along line A-A', according to an embodiment.

FIG. 8 is a perspective view illustrating a camera module 500 moving in one direction, with a cover member 560 excluded, according to an embodiment. FIG. 9 is a perspective view illustrating a camera module 500 moving in another direction, with a cover member 560 excluded, according to an embodiment. FIG. 10 is a cross-sectional view of a camera module 500, as shown in FIG. 8, taken along line A-A', according to an embodiment.

Referring to FIGS. 8 to 10, a camera module 500 may include a first assembly 510 including a first lens group 513, a second assembly 520 including a second lens group 523, a base 530 supporting the first assembly 510 and/or the second assembly 520, a circuit board 550 on which an image sensor 540 is disposed, a cover member 560, and a stopper 590 to restrict the movement of the first assembly 510.

The first assembly 510, second assembly 520, base 530, and stopper 590 of the camera module 500 shown in FIGS. 8 to 10 may be fully or partially the same in configuration as the first assembly 510, second assembly 520, base 530, and stopper 590 of the camera module 500 shown in FIGS. 6 and 7.

According to an embodiment, the camera module 500 may be configured such that the first lens group 513 and the second lens group 523 are laid over one another. For example, the second lens group (e.g., the second lens group 523 of FIG. 7) may be disposed under the first lens group 513. The first lens group 513 and the second lens group 523 may be spaced apart from each other, and be configured for movement in the same or different directions. For example, the first lens group 513 may be an assembly of a plurality of lenses and be configured with various optical members, such as a concave lens or convex lens, disposed along the optical path (e.g., the optical axis (O) direction). As another example, the second lens group 523 may be an assembly of a plurality of lenses and be configured with various optical members, such as a concave lens or convex lens, disposed along the optical path (e.g., the optical axis "O" direction).

According to an embodiment, the first lens group 513 may be disposed over the second lens group 523, and may be moved in a first direction +Z or −Z, as autofocusing of the camera module 500 is executed. The second lens group 523, along with the first lens group 513, may be moved in a second direction X or Y, as optical image stabilizing of the camera module 500 is executed.

According to an embodiment, the first assembly 510 including the first lens group 513 may include first magnets 515 that interact with the first coils 533 disposed on the base 530 and, together with the first coils 533, form a first voice coil motor. When a signal is applied to the first coil 533 through a flexible circuit board 532 as combined with the base 530, an electromagnetic force created between the first coil 533 and the first magnets 515 may traverse back and forth on the first housing 511 including the first lens group 513 along the optical axis O (e.g., the first direction +Z or −Z). According to an embodiment, a pair of first voice coil motors facing each other may also be provided. Each of the pair of first voice coil motors may have first sensors 539a (a first-first sensor and a first-second sensor). Each first sensor 539a may adjust the gap between the first coil 533 and the first magnet 515. For example, when the size of the gap between the first magnet 515 and the first coil 533 adjacent to the first-first sensor disposed on one surface of the third housing 531 increases, the size of the gap between the first magnet 515 and the first coil 533 adjacent to the first-second sensor disposed on the opposite surface of the third housing 531 decreases. The first-first sensor and the first-second sensor may use the operational relationship. For example, the position of the first assembly 510 may be measured by summating the output values of the first-first sensor and the first-second sensor, and the driving circuit disposed on the flexible circuit board may control the gap.

According to an embodiment, the second assembly 520 including the second lens group 523 may include second magnets 525 that interact with the second coils 534 disposed on the base 530 and, together with the second coils 534, form a second voice coil motor. When a signal is applied to the second coils 534 through the flexible circuit board 532 combined with the base 530, an electromagnetic force created between the second coils 534 and the second magnets 525 may move the second housing 521 including the second lens group 523 horizontally in the second direction X or Y on the plane perpendicular to the optical axis O. As another example, since at least part of the first housing 511 is received inside the second housing 521, the first housing 511, along with the second housing 521, may move horizontally in the second direction X or Y, on the plane perpendicular to the optical axis O.

According to an embodiment, the camera module 500 does not add an extra load except for the weight of the first voice coil motor and the second voice coil motor, thus allowing itself to be implemented compactly.

Figure 11:
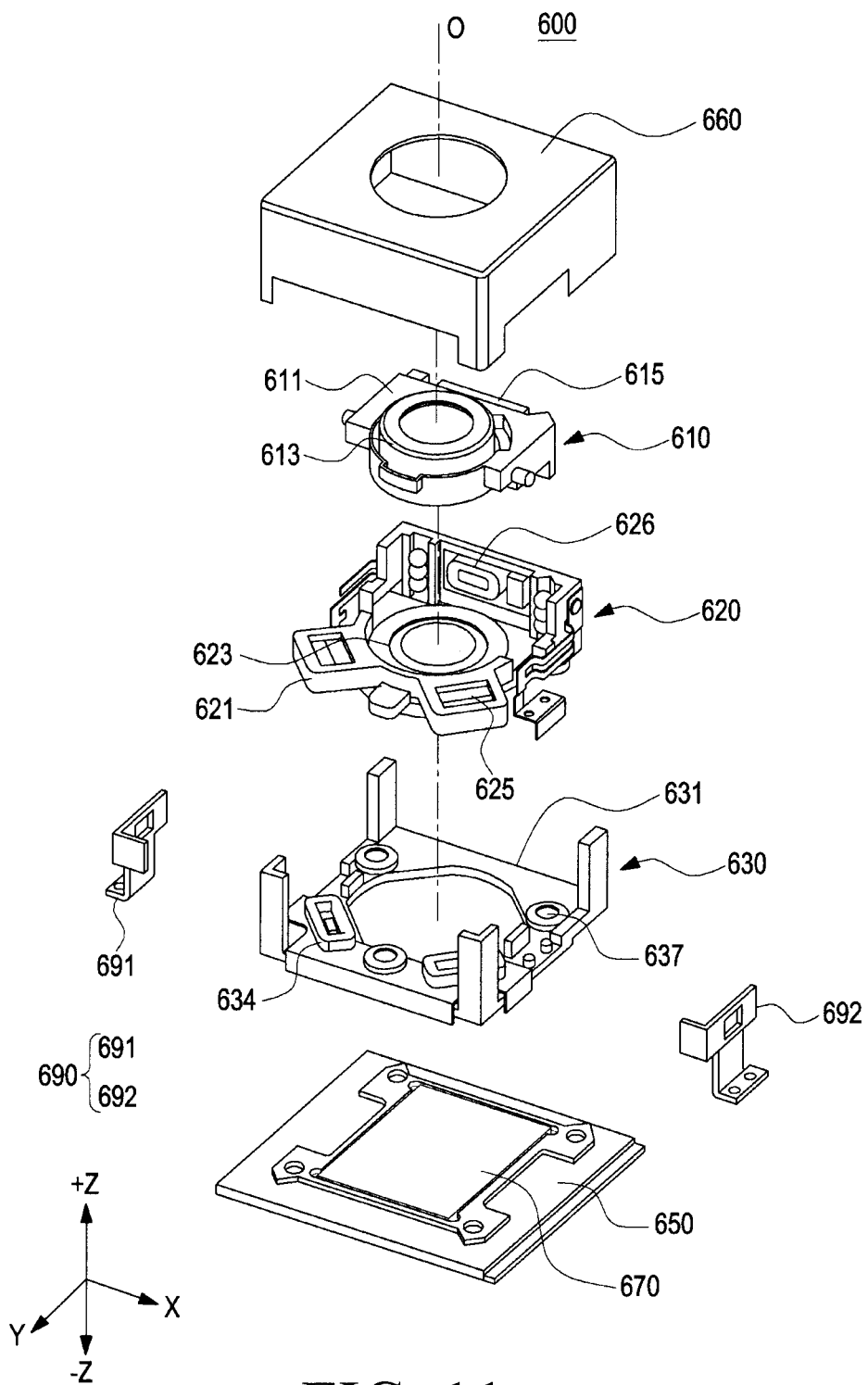
FIG. 11 is a perspective view illustrating an example camera module 600 partially disassembled, according to an embodiment.

FIG. 11 is a perspective view illustrating a camera module 600 partially disassembled, according to an embodiment.

Figure 12:
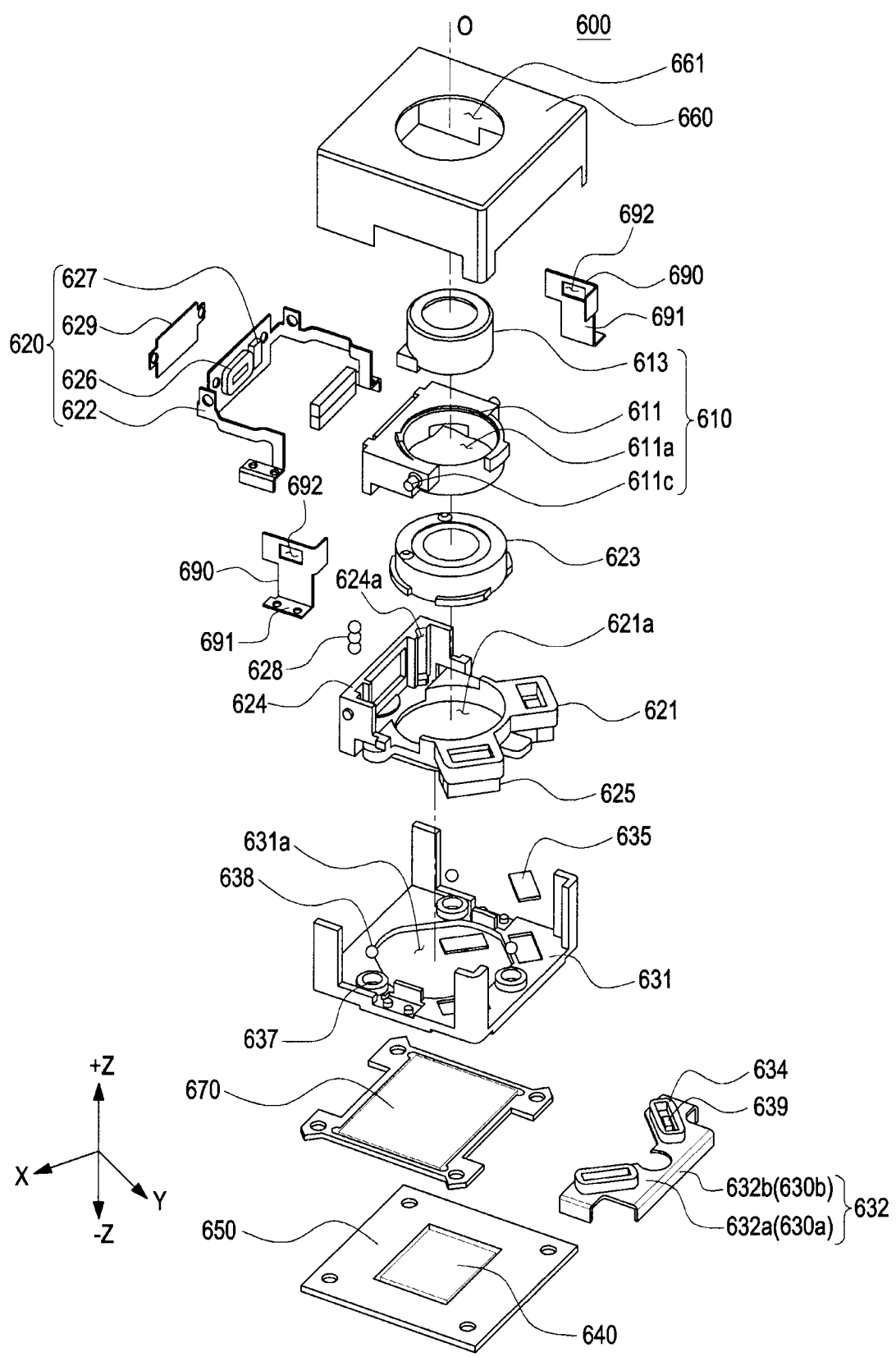
FIG. 12 is an exploded perspective view illustrating an example camera module 600 as shown in FIG. 11, according to an embodiment.

FIG. 12 is an exploded perspective view illustrating a camera module 600 as shown in FIG. 11, according to an embodiment.

Referring to FIGS. 11 and 12, a camera module 600 may include a first assembly 610 including a first lens group 613, a second assembly 620 including a second lens group 623, a base 630 supporting the first assembly 610 and/or the second assembly 620, a circuit board 650 on which an image sensor 640 is disposed, and a cover member 660. As another example, the camera module 600 may include at least one stopper 690 to restrict the movement of the first assembly 610.

The camera module 600 of FIGS. 11 and 12 may be fully or partly the same in structure as the camera module 180 of FIGS. 1 and 2, the camera module 112 of FIG. 4, and the camera module 390 of FIG. 5.

According to an embodiment, the camera module 600 may be configured such that the first lens group 613 and the second lens group 623 are disposed under the first lens group 613. The first lens group 613 and the second lens group 623 may be spaced apart from each other, and may implement movement in the same or different directions. For example, the first lens group 613 may be an assembly of a plurality of lenses and be configured with various optical members, such as a concave lens or convex lens, disposed along the optical path (e.g., the optical axis "O" direction). As another example, the second lens group 623 may be an assembly of a plurality of lenses and be configured with various optical members, e such as a concave lens or convex lens, disposed along the optical path (e.g., the optical axis "O" direction).

According to an embodiment, the first lens group 613 may be disposed over the second lens group 623 and may be moved in a first direction +Z or −Z as autofocusing of the camera module 600 is executed. The second lens group 623, along with the first lens group 613, may be moved in the second direction X or Y as optical image stabilizing of the camera module 600 is executed.

According to an embodiment, the first assembly 610 may include a first housing 611 and the first lens group 613 and first magnets 615 mounted in the first housing 611. The first housing 611 may include a central first through hole 611a which is centered to the optical axis O. The first lens group 613 may be mounted through the first through hole 611a of the first housing 611 and be fixed in the first housing 611 so as to be movable along with the first housing 611 along the optical axis O.

According to an embodiment, first magnets 615 may be disposed on one surface of the first housing 611. For example, the first magnets 615 of the first housing 611 may be disposed parallel to the optical axis O. The first magnet 615 may be disposed to face first coils 626 each disposed on one surface of the second housing 621. Although one first magnet 615 is shown, a plurality of first magnets 615 may be provided to face each other or be positioned perpendicular to each other.

According to an embodiment, the first housing 611 may be moved in the first direction +Z or −Z by an interaction between the first magnets 615 and the first coils 626 in order to shift the focus of the camera module 600. For example, when a signal is applied to the first coils 626 through a first flexible circuit board 622 mounted in the second assembly 620, an electromagnetic force created between the first coils 626 and the first magnets 615 may move back and forth the first housing 611 including the first lens group 613 along the optical axis O.

According to an embodiment, the second assembly 620 may include a second housing 621, a second lens group 623 and second magnets 625 mounted in the second housing 621, a first flexible circuit board 622 formed to surround at least one side surface of the second housing 621, and first coils 626 disposed on the first flexible circuit board. The second housing 621 may include a central second through hole 621a which is centered to the optical axis O. The second lens group 623 may be mounted through the second through hole 621a of the first housing 611.

According to an embodiment, the second housing 621 may receive at least part of the first housing 611. For example, the second housing 621 may be formed to have an opening in the first direction +Z or −Z and to surround at least a portion (e.g., a bottom portion) of the first housing 611. At least a portion (e.g., a top portion) of the second housing 621 may be formed to have a shape corresponding to a bottom portion of the first housing 611 to stably support the first housing 611 seated therein.

According to an embodiment, a plurality of second magnets 625 may be disposed towards the Z axis on side surfaces of the second housing 621. For example, the second housing 621 may include a pair of seats projecting in a direction perpendicular to the optical axis O around the second through hole 621a to seat the pair of second magnets 625 towards the base 630.

According to an embodiment, the second housing 621 may be moved in the second direction X or Y perpendicular to the first direction +Z or −Z by an interaction between second coils 634 disposed on the base 630 and the second magnets 625, at least partially correcting the movement of the camera module 600. For example, when a signal is applied to the second coils 634 through the second flexible circuit board 632 mounted on the base 630, an electromagnetic force created between the second coils 634 and the second magnets 625 may horizontally move the second housing 621 including the second lens group 623 in the second direction X or Y on the plane perpendicular to the optical axis O.

According to an embodiment, the first housing 611 received in the second housing 621 may, together with the first housing 611, be horizontally moved in the second direction X or Y as the second housing 621 is moved in the second direction X or Y.

According to an embodiment, the first flexible circuit board 622 may be formed to surround at least one outer surface of the second housing 621. The first flexible circuit board 622 may be implemented in a flexible shape and be formed corresponding to the shape of a step or rib of the second housing 621. As another example, the first flexible circuit board 622 may be formed reflecting an extra length to prevent a load from occurring due to the horizontal movement of the second housing 621 (refer to FIG. 17).

According to an embodiment, the first coils 626 may be disposed on the inner surface of the first flexible circuit board 622 so as to face the first magnets 615. For example, the first coil 626 may be formed on a different surface (e.g., a side surface) than the surface (e.g., bottom surface) where the second magnet 625 is formed. The first coils 626 disposed on the first flexible circuit board 622 may at least partially be exposed through the opening formed in the side surface of the second housing 621. The first coils 626, along with the first magnets 615 disposed in the first housing 611, may form a voice coil motor. When a signal is applied to the first coils 626 through the first flexible circuit board 622, an electromagnetic force created between the first coils 626 and the first magnets 615 may move back and forth the first housing 611 including the first lens group 613 along the optical axis O.

According to an embodiment, first sensors 627 may be disposed on the first flexible circuit board 622 to detect the displacement and/or position of the first assembly 610. For example, the first sensors 627 may be disposed on the inner side surface of the first flexible circuit board 622 adjacent to the first coils 626 and may be integrated with the first flexible circuit board 622. The first sensors 627 may be position detecting sensors, e.g., hall sensors. As another example, the first sensors 627 may be configured with, e.g., an optical or mechanical encoder. As another example, a driving circuit unit of the first flexible circuit board 622 may apply a driving signal for autofocusing to the first coils 626 based on, e.g., focusing state information provided through a separate path and position information of the first assembly 610 detected by the first sensors 627.

According to an embodiment, the second housing 621 may include a guide 624 to guide a back-and-forth motion of the first housing 611 received therein. For example, the guide 624 may be disposed on a side surface of the second housing 621 to direct a driving force created by the first coils 626 and the first magnets 615 in the first direction +Z or −Z. To smoothen the back-and-forth motion of the first assembly 610, a plurality of balls 628 may be provided between the guide 624 and the first assembly 610. For example, the balls 628 may roll between the guide 624 and the first assembly 610 to allow the first assembly 610 to smoothly move back and forth in the first direction +Z or −Z.

According to an embodiment, the second housing 621 may have guide grooves 624a, preventing the first assembly 610 from moving in directions other than the optical axis O. The guide grooves 624a may be formed on at least one of the guide 624 or the first housing 611, extend along the optical axis O, and have a V-shaped cross-section. In the configuration of the camera module 600 as shown, the guide grooves 624a are formed on each of the guide 624 and the first housing 611. The respective portions of the balls 628 may be disposed in the guide grooves 637 formed in the guide 624, and the respective opposite portions of the balls 628 may be disposed in the guide grooves (not shown) formed in a side surface of the first housing 611. By adopting the balls 628 with a sufficiently large diameter, although the balls 628 are partly received in the guide grooves 624a, a gap may be secured between the guide 624 and the first housing 611. This may prevent the guide 624 and the first housing 611 from directly contacting each other while enabling the first assembly 610 to move back and forth more smoothly.

According to an embodiment, a first yoke 629 may be mounted on the first flexible circuit board 622. The first yoke 629 may be disposed to face the first magnets 615, with the guide 624 of the second housing 621 interposed therebetween. As the first yoke 629 is provided, an electromagnetic force between the first coils 626 and the first magnets 615 may be focused, thus enhancing the efficiency of the voice coil motor. As another example, the first housing 611 may be pushed towards the guide 624 by the attraction between the first magnets 615 and the first yoke 629. The balls 628 between the guide 624 and the first assembly 610 may keep the first assembly 610 smoothly moving back and forth.

According to an embodiment, the base 630 may include a third housing 631, the second flexible circuit board 632 formed to surround at least one side surface of the third housing 631, and the second coils 634. The third housing 631 may have a center opening 631a which is centered to the optical axis O. The base 630 may receive the first housing 611 and the second housing 621 that are at least partially laid one over the other.

According to an embodiment, the third housing 631 and the second flexible circuit board 632 may include a first surface (e.g., a bottom surface) 630a facing the bottom of the second housing 621 and a second surface (e.g., a wall surface) 630b perpendicular to the first surface 630a. The opening 631a may be formed in at least a portion of the first surface 630a, and the second coil 634 may be disposed adjacent to the opening 631a on a portion of the first surface 630a or the second surface 630b.

According to an embodiment, the second flexible circuit board 632 may be formed to surround at least one surface (e.g., a portion of the first surface 632a) of the third housing 631. The flexible circuit board 632 may be implemented in a flexible shape and be formed corresponding to the shape of a step or rib of the third housing 631.

According to an embodiment, the pair of second coils 634 may be spaced apart and parallel to each other in the first direction +Z or −Z on the first surface 632a of the second flexible circuit board 632. The pair of second coil 634 disposed on the flexible circuit board 632 may face the pair of second magnets 625 disposed on the second housing 621. The second coils 634, along with the second magnets 625 disposed in the second housing 621, may form a voice coil motor. When a signal is applied to the second coils 634 through the flexible circuit board 632, an electromagnetic force created between the second coils 634 and the second magnets 625 may horizontally move the second housing 621 including the second lens group 623 in the second direction X or Y on the plane perpendicular to the optical axis O.

According to an embodiment, the base 630 may include second sensors 639 to detect the displacement and/or position of the second assembly 620. For example, the second sensors 639 may be disposed on the first surface 632a of the second flexible circuit board 632 to at least partially be surrounded by the second coils 634 and may be integrated with the second flexible circuit board 632. The second sensors 639 may be position detecting sensors, e.g., hall sensors. As another example, the second sensors 639 may be configured with, e.g., an optical or mechanical encoder. As another example, a driving circuit unit of the second flexible circuit board 632 may apply a driving signal for autofocusing to the second coils 634 based on, e.g., focusing state information provided through a separate path and position information of the second assembly 620 detected by the second sensors 639.

According to an embodiment, a second yoke 635 may be mounted on the bottom surface facing in the first direction +Z or −Z of the third housing 631. The second yoke 635 may be disposed to face the second magnets 625, with the second coils 634 interposed therebetween. As the second yoke 635 is provided, an electromagnetic force between the second coils 634 and the second magnets 625 may be focused, thus enhancing the efficiency of the voice coil motor. As another example, the second housing 621 may be pushed towards the third housing 631 by the attraction between the second magnets 625 and the second yoke 635. The balls 638 between the second housing 621 and the third housing 631 may allow the second assembly 620 to smoothly move horizontally on the plane perpendicular to the optical axis O in the second direction X or Y.

According to an embodiment, the base 630 may include guide holes 637 to guide the movement of the second assembly 620 and other balls 638. There may be a plurality of guide holes 637 at the corners on the bottom surface of the third housing 631. The guide grooves 624a may prevent the second assembly 620 from moving in directions other than the horizontal direction (e.g., the second direction X or Y).

For example, the balls 628 may roll between the third housing 631 and the second housing 621, allowing the second assembly 620 to smoothly move horizontally.

According to an embodiment, the guide holes 637 may be formed in at least one of the third housing 631 or the second housing 621 and have a cylinder shape with a diameter larger than the balls 638. The respective portions of the balls 638 may be disposed in the guide holes 637 formed in the third housing 631, and the respective opposite portions of the balls 638 may be disposed in the guide holes (not shown) formed in a side surface of the second housing 621. By adopting the balls 638 with a sufficiently larger diameter than the height of the guide holes 637, although the balls 638 are partly received in the guide holes 637, a gap may be secured between the third housing 631 and the second housing 621. This may prevent the third housing 631 and the second housing 621 from directly contacting each other while enabling the second assembly 620 to move horizontally more smoothly.

According to an embodiment, the camera module 600 may include a stopper 690 to restrict the movement of the first assembly 610. The stopper 690 may be attached on one surface of the third housing 631 by a screw or other coupling member, restricting the movement in the first direction +Z or −Z of the first assembly 610 disposed inside the third housing 631.

According to an embodiment, the stopper 690 may include a supporting part 691 attached to the third housing 631 and at least one path restricting part 692 extending from the supporting part 691. The path restricting part 692 may provide a hole to limit the movement of a protrusion 611c of the first housing 611 within a predetermined distance in the first direction +Z or −Z. As another example, the path restricting part 692 may provide a hole to limit the movement of a protrusion 611c of the first housing 611 within a predetermined distance in the second direction X or Y. As another example, the stopper 690 may have a step to further restrict the movement of the first housing 611.

According to an embodiment, there may be provided a plurality of stoppers 690 (e.g., a first stopper 691 and a second stopper 692) to stably support the movement of the first housing 611. For example, the first stopper 691 may be disposed on a different surface than the surface where the first magnet 615 is disposed, and the second stopper 692 may be disposed to face the first stopper 691, with the first housing 611 interposed.

According to an embodiment, the camera module 600 may include a circuit board 650 including the image sensor 640. The circuit board 650 including the image sensor 640 may be disposed adjacent to the bottom surface of the third housing 631. The image sensor 640 may be installed on the bottom surface of the third housing 631 so as to face the open top surface (with the opening 631a) of the third housing 631 The image sensor 640 may be mounted on the circuit board 650 and be connected to an image processing device of the electronic device packing the camera module 600, e.g., a digital camera, mobile communication terminal, or tablet PC. As another example, an infrared (IR) filter 670 may be disposed between the circuit board 650 on which the image sensor 640 is disposed and the third housing 631.

According to an embodiment, the camera module 600 may further include a cover member 660 to close the open top surfaces of the housings (e.g., the first housing 611, the second housing 621, and the third housing 631). After the first housing 611 and the second housing 621 are installed in the third housing 631, the cover member 660 may close the housings, protecting the internal space. As another example, the cover member 660 may include a top opening 661 through which at least part of the first lens group 613 may be exposed to the outside.

The operation of the camera module 600 and the structure of the first flexible circuit board 622 are described below in detail.

Figure 13:
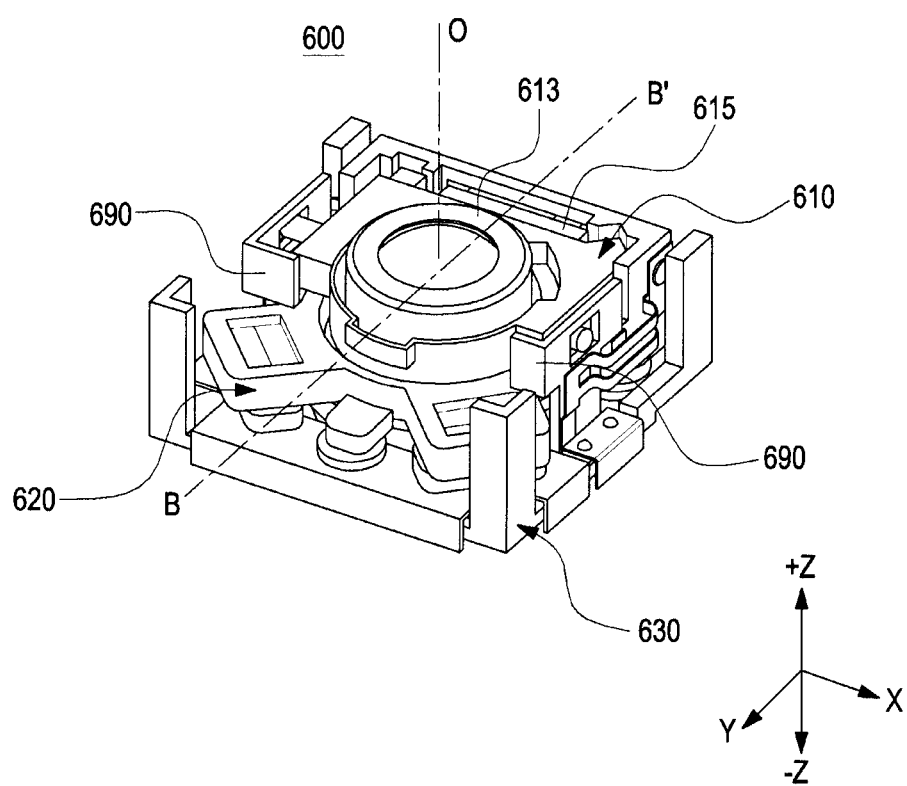
FIG. 13 is a perspective view illustrating an example camera module 600 moving in one direction, with a cover member 660 excluded, according to an embodiment.
Figure 14:
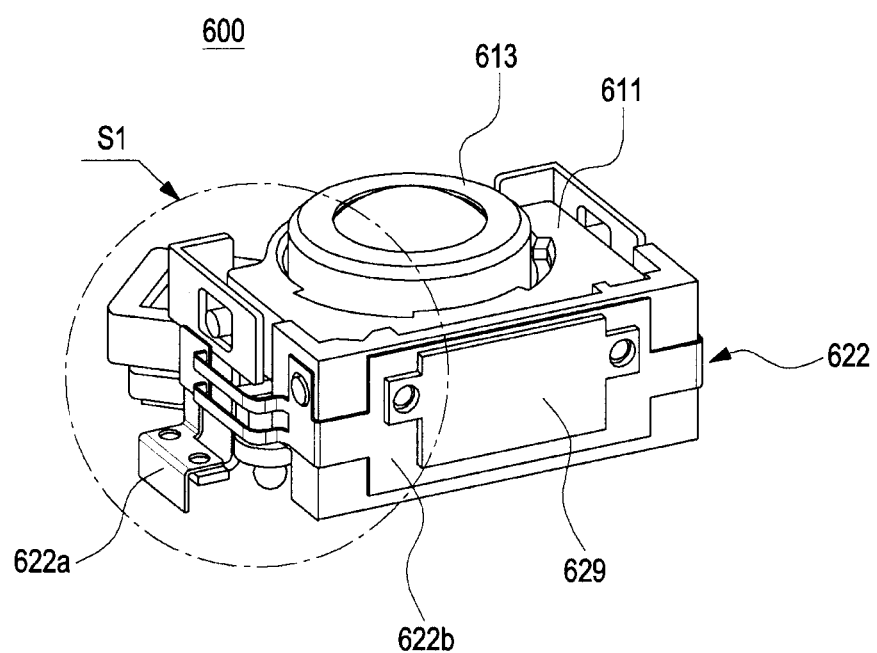
FIG. 14 is a perspective view illustrating an example camera module 600 moving in another direction, with a cover member 660 excluded, according to an embodiment.
Figure 15:
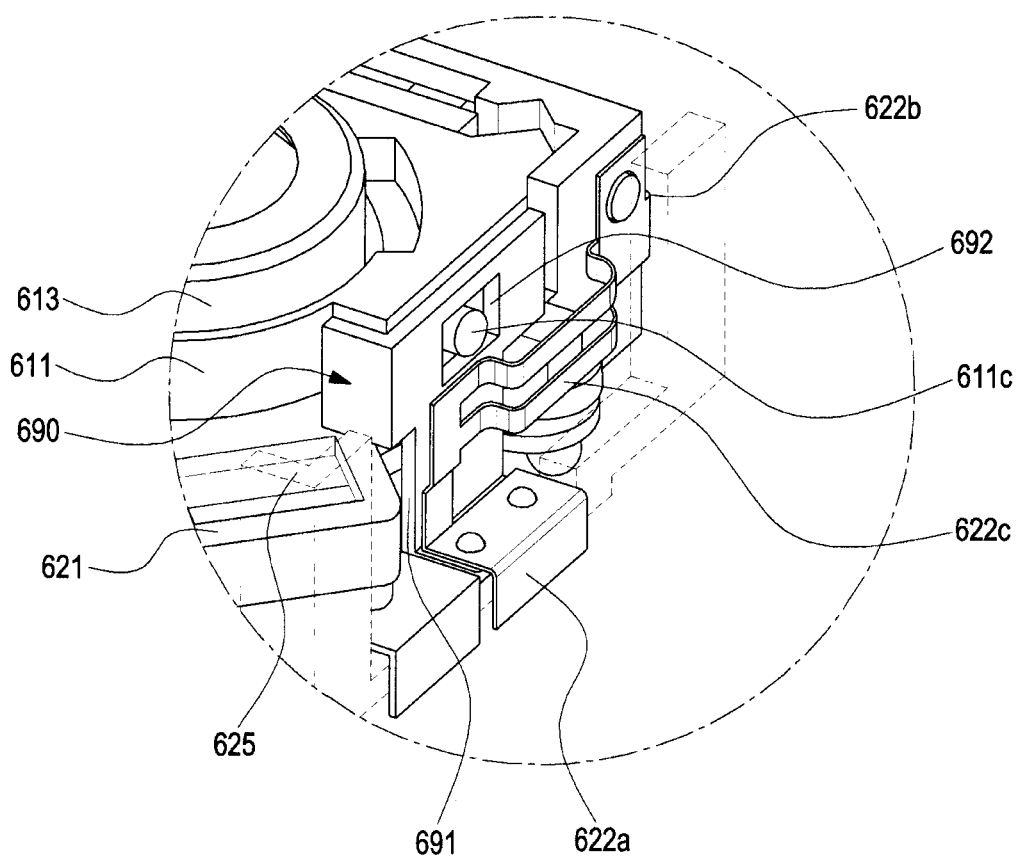
FIG. 15 is an enlarged perspective view illustrating a portion of an example camera module 600, as shown in FIG. 13, in which a first flexible circuit board 622 is disposed, according to an embodiment.
Figure 16:
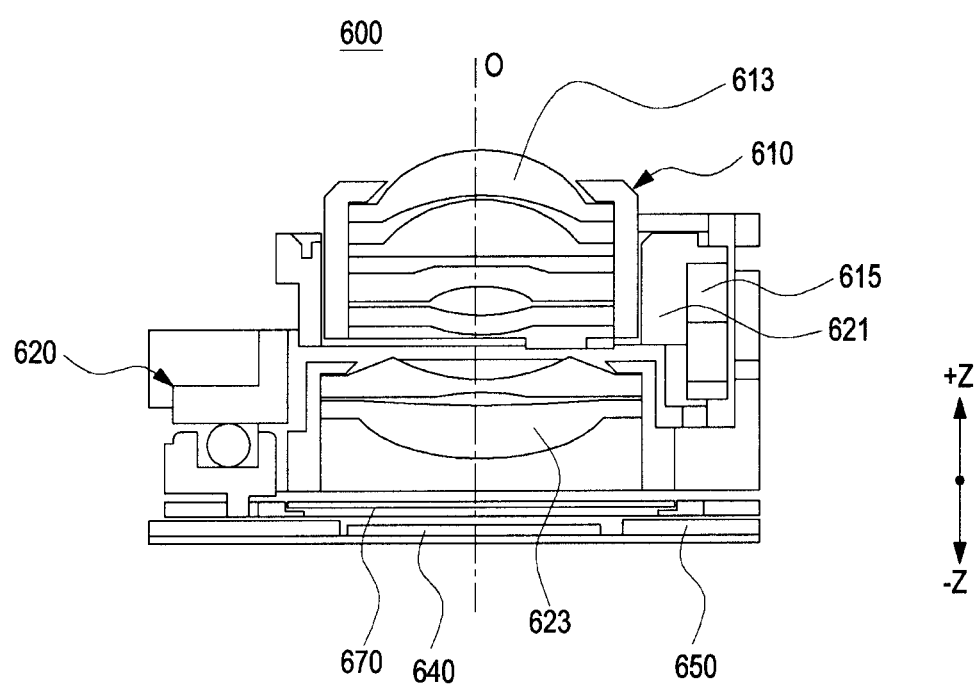
FIG. 16 is a cross-sectional view of an example camera module 600, as shown in FIG. 13, taken along line B-B', according to an embodiment.

FIG. 13 is a perspective view illustrating a camera module 600 moving in one direction, with a cover member 660 excluded, according to an embodiment. FIG. 14 is a perspective view illustrating a camera module 600 moving in another direction, with a cover member 660 excluded, according to an embodiment. FIG. 15 is an enlarged perspective view illustrating a portion S1 of a camera module 600, as shown in FIG. 13, in which a first flexible circuit board 622 is disposed, according to an embodiment. FIG. 16 is a cross-sectional view of a camera module 600, as shown in FIG. 13, taken along line B-B', according to an embodiment.

Referring to FIGS. 13 to 16, a camera module 600 may include a first assembly 610 including a first lens group 613, a second assembly 620 including a second lens group 623, a base 630 supporting the first assembly 610 and/or the second assembly 620, a circuit board 650 on which an image sensor 640 is disposed, a cover member 660, and a stopper 690 to restrict the movement of the first assembly 610.

The first assembly 610, second assembly 620, base 630, and stopper 690 of the camera module 600 shown in FIGS. 13 to 16 may be fully or partially the same in configuration as the first assembly 610, second assembly 620, base 630, and stopper 690 of the camera module 600 shown in FIGS. 11 and 12.

According to an embodiment, the camera module 600 may be configured such that the first lens group 613 and the second lens group 623 are laid over one another. For example, the second lens group 623 may be disposed under the first lens group 613. The first lens group 613 and the second lens group 623 may be spaced apart from each other and may implement movement in the same or different directions. For example, the first lens group 613 may be an assembly of a plurality of lenses and be configured with various optical members, such as a concave lens or convex lens, disposed along the optical path (e.g., the optical axis "O" direction). As another example, the second lens group 623 may be an assembly of a plurality of lenses and be configured with various optical members, such as a concave lens or convex lens, disposed along the optical path (e.g., the optical axis "O" direction).

According to an embodiment, the first lens group 613 may be disposed over the second lens group 623 and may be moved in a first direction +Z or −Z as autofocusing of the camera module 600 is executed. The second lens group 623, along with the first lens group 613, may be moved in a second direction X or Y as optical image stabilizing of the camera module 600 is executed.

According to an embodiment, the first assembly 610 including the first lens group 613 may include first magnets 615 that may interact with the first coils 626 disposed on the second housing 621 and, together with the first coils 533, form a first voice coil motor. When a signal is applied to the first coils 626 through a first flexible circuit board 622 combined with the second housing 621, an electromagnetic force created between the first coils 626 and the first magnets 615 may move back and forth the first housing 611 including the first lens group 613 along the optical axis O.

According to an embodiment, the first flexible circuit board 622 may be formed to surround at least one outer surface of the second housing 621. For example, the first flexible circuit board 622 may include first supporting parts 622a coupled with the base 630 and/or the stoppers 690 to support, second supporting parts 622b fastened to side surfaces of the second housing 621, and transforming parts 622c disposed between the first supporting parts 622a and the second supporting parts 622b so as to be transformable according to the movement of the first housing 611.

According to an embodiment, the transforming parts 622c may be formed with an extra length to prevent the first flexible circuit board 622 from receiving a load due to the mutual movement of the first housing 611 and the second housing 621. For example, the transforming parts 622c of the first flexible circuit board 622 may be formed so as to be substantially longer than the distance between the first supporting parts 622a and the second supporting parts 622b. The transforming parts 622c may be formed on two opposite surfaces of the three surfaces on which the first flexible circuit board 622 is disposed so as to be spaced apart from the surfaces.

According to an embodiment, the second assembly 620 including the second lens group 623 may include second magnets 625 that may interact with the second coils 634 disposed on the base 630 and, together with the second coils 534, form a second voice coil motor. When a signal is applied to the second coils 634 through the flexible circuit board 632 combined with the base 630, an electromagnetic force created between the second coils 634 and the second magnets 625 may horizontally move the second housing 621 including the second lens group 623 in the second direction X or Y on the plane perpendicular to the optical axis O. As another example, since at least part of the first housing 611 is received inside the second housing 621, the first housing 611, along with the second housing 621, may horizontally move in the second direction X or Y on the plane perpendicular to the optical axis O.

According to an embodiment, the camera module 600 may be implemented to prevent the driving and sensing of the first assembly 610 from being influenced by the driving of the second assembly 620 by the second voice coil motor, thus allowing itself to be driven in a stable manner.

According to an embodiment, a camera module (e.g., the camera module 500 of FIG. 7) may include a first housing (e.g., the first housing 511 of FIG. 7) including a first lens group (e.g., the first lens group 513 of FIG. 7) and a first magnet (e.g., the first magnet 515 of FIG. 7), a second housing (e.g., the second housing 521 of FIG. 7) including a second lens group (e.g., the second lens group 523 of FIG. 7) and a second magnet (e.g., the second magnet 525 of FIG. 7) and configured to receive at least part of the first housing, a third housing (e.g., the third housing 531 of FIG. 7) including a bottom surface (e.g., the bottom surface 530a of FIG. 7) with an opening (e.g., the opening 531a of FIG. 7) and a wall surface (e.g., the side surface 530b of FIG. 7) perpendicular to the bottom surface and configured to receive at least part of the second housing, the third housing including a first coil (e.g., the first coil 533 of FIG. 7) formed on a portion of the wall surface and a second coil (e.g., the second coil 534 of FIG. 7) formed on a portion of the wall surface or the bottom surface, and a circuit board (e.g., the circuit board 550 of FIG. 7) including an image sensor (e.g., the image sensor 540 of FIG. 7) and disposed adjacent to the bottom surface. The first housing may be configured to be moved in a first direction (e.g., the first direction +Z or −Z of FIG. 7) by an interaction between the first magnet and the first coil in order to shift the focus of the camera module, and the second housing may be configured to be moved in a second direction (e.g., the second direction X or Y of FIG.

7) by an interaction between the second magnet and the second coil in order to at least partially correct the shaking of the camera module.

According to an embodiment, the first housing may be moved in the second direction corresponding to a movement of the second housing, and the second direction may be perpendicular to the first direction.

According to an embodiment, the camera module may further include a stopper (e.g., the stopper 590 of FIG. 7) fastened to a surface of the third housing to restrict a movement range of the first housing in the first direction.

According to an embodiment, the stopper may include a supporting part (e.g., the supporting part 591 of FIG. 7) coupled with the third housing and at least one path restricting part (e.g., the path restricting part 592 of FIG. 7) extending from the supporting part and forming a step configured to restrict a movement of a portion of the first housing in the first direction.

According to an embodiment, the camera module may further include a guide (e.g., the guide 524 of FIG. 7) extending from a bottom surface of the second housing in the first direction and balls (e.g., the balls 528 of FIG. 7) disposed between the guide and the first housing. When the first lens group moves back and forth in the first direction, the balls may roll between the guide and the first housing.

According to an embodiment, the camera module may further include a yoke (e.g., the first yoke 529 of FIG. 7) mounted on an outer surface of the guide and positioned to face a supporting magnet with the guide interposed therebetween.

According to an embodiment, the camera module may further include a position detecting sensor (e.g., the first sensor 539*a* of FIG. 7) disposed adjacent to the first coil and configured to detect a displacement of the first housing in the first direction.

According to an embodiment, a camera module (e.g., the camera module 600 of FIG. 12) may include a first housing (e.g., the first housing 621 of FIG. 12) including a first lens group (e.g., the first lens group 613 of FIG. 12) and a first magnet (e.g., the first magnet 615 of FIG. 12), a second housing (e.g., the second housing 621 of FIG. 12) including a second lens group (e.g., the second lens group 623 of FIG. 12) and a second magnet (e.g., the second magnet 625 of FIG. 12) and configured to receive at least part of the first housing, the second housing including a first coil (e.g., the first coil 626 of FIG. 12) on a surface different from the surface on which the second magnet is formed, a third housing (e.g., the third housing 631 of FIG. 12) including a bottom surface (e.g., the bottom surface 630*a* of FIG. 12) with an opening (e.g., the opening 631*a* of FIG. 12) and a wall surface (e.g., the side surface 630*b*, also labeled as 632*b*, of FIG. 12) perpendicular to the bottom surface and configured to receive at least part of the second housing, the third housing including a second coil (e.g., the second coil 634 of FIG. 12) formed on a portion of the wall surface or the bottom surface, and a circuit board (e.g., the circuit board 650 of FIG. 12) including an image sensor (e.g., the image sensor 640 of FIG. 12) and disposed adjacent to the bottom surface. The first housing may be configured to be moved in a first direction (e.g., the first direction +Z or −Z of FIG. 12) by an interaction between the first magnet and the first coil in order to shift to focus of the camera module, and the second housing may be configured to be moved in a second direction (e.g., the second direction X or Y of FIG. 12) by an interaction between the second magnet and the second coil to at least partially correct the shaking of the camera module.

According to an embodiment, the first housing may be moved in the second direction corresponding to a movement of the second housing, and the second direction may be perpendicular to the first direction.

According to an embodiment, the camera module may further include a stopper (e.g., the stopper 690 of FIG. 12) fastened to a surface of the third housing to restrict a movement range of the first housing in the first direction or the second direction.

According to an embodiment, the stopper may include a supporting part (e.g., the supporting part 691 of FIG. 12) coupled with the third housing and a path restricting part (e.g., the path restricting part 692 of FIG. 12) extending from the supporting part and configured to guide a limited movement of a portion of the first housing in the first direction or the second direction.

According to an embodiment, the camera module may further include a guide (e.g., the guide 624 of FIG. 12) extending from a bottom surface of the second housing in the first direction and balls (e.g., the balls 628 of FIG. 12) disposed between the guide and the first housing. When the first lens group moves back and forth in the first direction, the balls may roll between the guide and the first housing.

According to an embodiment, the camera module may further include a yoke (e.g., the first yoke 629 of FIG. 12) mounted on an outer surface of the guide and positioned to face the first magnet with the guide interposed therebetween.

According to an embodiment, the camera module may further include a flexible circuit board (e.g., the first flexible circuit board 622 of FIGS. 12 and 15) formed to surround at least part of an outer surface of the second housing, such that the flexible circuit board may include a transforming part (e.g., the transporting part 622*c* of FIG. 15) configured to be transformable corresponding to a movement of the first housing.

According to an embodiment, the flexible circuit board may include a first supporting part (e.g., the first supporting part 622*a* of FIG. 15) coupled to each of two opposite ends of the third housing, a second supporting part (e.g., the second supporting part 622*b* of FIG. 15) fastened to a side surface of the second housing, and the transforming part disposed between the first supporting part and the second supporting part and configured to be transformable corresponding to a movement of the first housing in the first direction. The transforming part may be formed to be longer than the distance between the first supporting part and the second supporting part.

According to an embodiment, the camera module may further include a first position detecting sensor (e.g., the first sensor 627 of FIG. 12) disposed adjacent to the first coil and configured to detect a displacement of the first housing in the first direction and a second position detecting sensor (e.g., the second sensor 639 of FIG. 12) disposed adjacent to the second coil and configured to detect a displacement of the second housing in the second direction.

According to an embodiment, a camera module may include a first housing including a first lens group, a second housing including a second lens group and configured to receive at least part of the first housing, a third housing including a first surface with an opening and a second surface perpendicular to the first surface and configured to receive at least part of the second housing, at least one first magnet disposed on an outer side surface of the first housing, at least one second magnet disposed on a surface of the second housing, at least one first coil disposed to face the at least one first magnet, at least one second coil disposed to face the first surface or the second surface of the third housing and to face the at least one second magnet, and a circuit board including an image sensor facing the opening and disposed adjacent to the first surface. The first housing may be configured to be moved in a first direction by an interaction between the first magnet and the first coil in order to shift the focus of the camera module, and the second housing may be configured to be moved in a second direction by an interaction between the second magnet and the second coil to at least partially correct the shaking of the camera module.

According to an embodiment, the camera module may further include a stopper fastened to a surface of the third housing to restrict a movement range of the first housing in the first direction.

According to an embodiment, the camera module may further include a flexible circuit board formed to surround at least part of an outer surface of the second housing. The first coil may be mounted on the flexible circuit board so as to face the first magnet of the first housing through an opening formed in a side surface of the second housing.

According to an embodiment, the camera module may further include a flexible circuit board formed to surround at least part of an outer surface of the second housing. The flexible circuit board may include a transforming part configured to be transformable corresponding to a movement of the first housing in the first direction.

As is apparent from the foregoing description, according to an embodiment, there may be implemented a camera module with a plurality of lens groups, providing for a better-performance optical system.

According to an embodiment, a camera module includes a plurality of lens groups (e.g., a first lens group and a second lens group. An autofocusing structure with the first lens group may receive at least part of an optical image stabilizer structure with the second lens group, allowing for a smaller optical system.

According to an embodiment, a camera module may provide an autofocusing structure free of influences by an optical image stabilizer.

According to an embodiment, a camera module does not add an extra load except for an optical image stabilizer driver and an autofocusing driver, thereby achieving compactness.

It is apparent to one of ordinary skill in the art that the camera modules according to certain embodiments of the disclosure as described above are not limited to the above-described embodiments and those shown in the drawings, and various changes, modifications, or alterations may be made thereto without departing from the disclosure.

What is claimed is:

1. A camera module, comprising:
   a first housing including a first lens group and a first magnet;
   a second housing including a second lens group spaced apart from the first lens group and a second magnet, the second housing configured to receive at least part of the first housing;
   a third housing including a bottom surface including an opening, and a wall surface perpendicular to the bottom surface of the third housing, the third housing configured to receive at least part of the second housing, the third housing further including a first flexible circuit board forming a pair of walls facing each other, first coils formed on a portion of the pair of walls, and second coils formed on two prongs extending from the first flexible circuit board adjacent to the bottom surface of the third housing; and a second circuit board including an image sensor, the second circuit board disposed adjacent the bottom surface of the third housing,
   wherein the first housing is moveable in a first direction responsive to an interaction between the first magnet and the first coils that adjusts a focus of the camera module, and the second housing is moveable in a second direction responsive to an interaction between the second magnet and the second coils that at least partially compensates for shaking of the camera module.

2. The camera module of claim 1, wherein the first housing moves in the second direction corresponding to a movement of the second housing, and
   wherein the second direction is perpendicular to the first direction, and
   wherein coils of the second coils are disposed such that axes extending lengthwise through the second coils are orthogonal to one another.

3. The camera module of claim 1, further comprising a stopper coupled to a surface of the third housing to restrict a movement range of the first housing in the first direction.

4. The camera module of claim 3, wherein the stopper includes a supporting part coupled with the third housing, and at least one path restricting part extending from the supporting part as to form a step configured to restrict the movement range in the first direction.

5. The camera module of claim 1, further comprising:
   a guide extending in the first direction from a bottom surface of the second housing; and
   a plurality of bearings disposed between the guide and the first housing,
   wherein when the first lens group moves back and forth in the first direction, the plurality of bearings are configured to roll between the guide and the first housing.

6. The camera module of claim 5, further comprising a yoke mounted on an outer surface of the guide, and oriented as to face a supporting magnet, the guide interposed between the yoke and the supporting magnet.

7. The camera module of claim 1, further comprising a position detecting sensor disposed adjacent to the first coils, and configured to detect displacement of the first housing in the first direction.

8. A camera module, comprising:
   a first housing including a first lens group and a first magnet;
   a second housing including a second lens group spaced apart from the first lens group, a second magnet, and first coils, the second magnet and the first coils mounted on different surfaces respectively, the second housing further configured to receive at least part of the first housing;
   a third housing including a bottom surface including an opening, and a wall surface disposed perpendicular to the bottom surface and configured to receive at least part of the second housing, the third housing further including a first flexible circuit board forming a pair of walls facing each other, the first coils formed on a portion of the pair of walls, and second coils formed on two prongs extending from the first flexible circuit board adjacent to the bottom surface; and
   a second circuit board including an image sensor and disposed adjacent to the bottom surface,
   wherein the first housing is moveable in a first direction responsive to an interaction between the first magnet and the first coils adjusting a focus of the camera module, and the second housing is moveable in a second direction responsive to an interaction between the second magnet and the second coils at least partially compensating for shaking of the camera module.

9. The camera module of claim 8, wherein the first housing moves in the second direction corresponding to a movement of the second housing,
  wherein the second direction is perpendicular to the first direction, and
  wherein coils of the second coils are disposed such that axes extending lengthwise through the second coils are orthogonal to one another.

10. The camera module of claim 9, further comprising a stopper coupled to a surface of the third housing to restrict a movement range of the first housing in the first direction or the second direction.

11. The camera module of claim 10, wherein the stopper includes:
  a supporting part coupled with the third housing; and
  a path restricting part extending from the supporting part, and configured to guide a limited movement of a portion of the first housing in the first direction or the second direction.

12. The camera module of claim 8, further comprising:
  a guide extending in the first direction from a bottom surface of the second housing; and
  bearings disposed between the guide and the first housing,
  wherein when the first lens group moves back and forth in the first direction, the bearings are configured to roll between the guide and the first housing.

13. The camera module of claim 12, further comprising a yoke mounted on an outer surface of the guide oriented as to face the first magnet with the guide interposed between the yoke and the first magnet.

14. The camera module of claim 8, wherein the first flexible circuit board at least partially surrounds at least a part of an outer surface of the second housing,
  wherein the first flexible circuit board includes a transforming part that is transformable corresponding to a movement of the first housing.

15. The camera module of claim 14, wherein the first flexible circuit board includes:
  a first supporting part coupled to each of two opposite ends of the third housing;
  a second supporting part coupled to a side surface of the second housing; and
  a transforming part disposed between the first supporting part and the second supporting part, the transforming part transformable according to a movement of the first housing in the first direction, and
  wherein the transforming part is formed having a length longer than a distance between the first supporting part and the second supporting part.

16. The camera module of claim 8, further comprising:
  a first position detecting sensor disposed adjacent to the first coils and configured to detect a displacement of the first housing in the first direction; and
  a second position detecting sensor disposed adjacent to the second coils and configured to detect a displacement of the second housing in the second direction.

17. A camera module, comprising:
  a first housing including a first lens group;
  a second housing including a second lens group spaced apart from the first lens group, the second housing configured to receive at least part of the first housing;
  a third housing including a first surface including an opening, and a second surface perpendicular to the first surface, the third housing configured to receive at least part of the second housing, the third housing further including a first flexible circuit board forming a pair of walls facing each other;
  at least one first magnet disposed on an outer side surface of the first housing;
  at least one second magnet disposed on a surface of the second housing;
  first coils formed on a portion of the pair of walls of the first flexible circuit board, oriented as to face the at least one first magnet;
  second coils formed on two prongs extending from the first flexible circuit board adjacent to a bottom surface of the third housing, oriented as to face the first surface or the second surface of the third housing and oriented as to face the at least one second magnet; and
  a second circuit board including an image sensor facing the opening and disposed adjacent to the first surface,
  wherein the first housing is moveable in a first direction responsive to an interaction between the first magnet and the first coils adjusting a focus of the camera module, and the second housing is moveable in a second direction by an interaction between the second magnet and the second coils at least partially compensating for a shaking of the camera module.

18. The camera module of claim 17, further comprising a stopper coupled to a surface of the third housing restricting a movement range of the first housing in the first direction.

19. The camera module of claim 18, further comprising a first flexible circuit board formed as to at least partially surround at least part of an outer surface of the second housing,
  wherein the first coils are mounted on the first flexible circuit board as to face the first magnet of the first housing through an opening formed in a side surface of the second housing.

20. The camera module of claim 18, further comprising a first flexible circuit board formed to at least partially surround at least part of an outer surface of the second housing,
  wherein the first flexible circuit board includes a transforming part that is transformable according to a movement of the first housing in the first direction.

* * * * *